(12) United States Patent
S et al.

(10) Patent No.: US 12,235,975 B2
(45) Date of Patent: Feb. 25, 2025

(54) QUICK MANAGEMENT ACTION SYSTEM

(71) Applicant: Dell Products L.P., Round Rock, TX (US)

(72) Inventors: Vivek S, Bangalore (IN); Shine Karingattil Achuthan, Bangalore (IN); Sasikumar Subramani, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 314 days.

(21) Appl. No.: 17/681,334

(22) Filed: Feb. 25, 2022

(65) Prior Publication Data

US 2023/0274010 A1    Aug. 31, 2023

(51) Int. Cl.
*G06F 21/62*    (2013.01)
*G06F 21/31*    (2013.01)

(52) U.S. Cl.
CPC .............. *G06F 21/62* (2013.01); *G06F 21/31* (2013.01); *G06F 2221/2141* (2013.01)

(58) Field of Classification Search
CPC .......... G06F 21/31; G06F 21/44; G06F 21/62; G06F 2221/2141; H04L 63/08; H04L 63/0823; H04W 12/06; G05B 13/042; G05B 13/048; G05B 13/0265
USPC .................................................. 726/5; 727/5
See application file for complete search history.

(56) References Cited

U.S. PATENT DOCUMENTS

| | | | |
|---|---|---|---|
| 8,869,239 B2 * | 10/2014 | Pahlavan | H04L 63/126 715/740 |
| 2008/0046967 A1 * | 2/2008 | Pan | G06Q 20/351 726/19 |
| 2010/0058189 A1 * | 3/2010 | Daffner | G05B 19/0426 709/227 |
| 2011/0289287 A1 * | 11/2011 | Yamamoto | G06F 3/0605 711/E12.001 |
| 2012/0188064 A1 * | 7/2012 | Mahaffey | H04L 63/1441 340/384.1 |
| 2015/0163282 A1 * | 6/2015 | Siegman | G06F 3/0605 709/208 |
| 2015/0350177 A1 * | 12/2015 | Sharp | G06Q 20/321 726/6 |
| 2015/0371032 A1 * | 12/2015 | Puli | H04L 63/08 726/7 |
| 2016/0301768 A1 * | 10/2016 | Garces-Erice | G06F 9/5077 |
| 2018/0114010 A1 * | 4/2018 | Van Os | G06F 3/03547 |

(Continued)

*Primary Examiner* — James N Fiorillo
(74) *Attorney, Agent, or Firm* — Joseph Mencher

(57) ABSTRACT

A quick management action system includes a computing device having a management subsystem that is coupled to a management device. The management subsystem provides a management subsystem Graphical User Interface (GUI) launch page for display on the management device, receives credentials and an identification of a management action associated with the computing device from the management device via the management subsystem GUI launch page. The management subsystem then, automatically while the management subsystem GUI launch page is provided for display on the management device, authenticates the credentials, authorizes the management action based on the credentials and, in response, performs the management action, and provides information associated with a result of the performance of the management action for display on the management subsystem GUI launch page.

20 Claims, 27 Drawing Sheets

(56) References Cited

U.S. PATENT DOCUMENTS

2018/0124115 A1\* 5/2018 Ansari .................... G10L 15/22
2022/0344937 A1\* 10/2022 Hu ..................... G05B 13/0265

\* cited by examiner

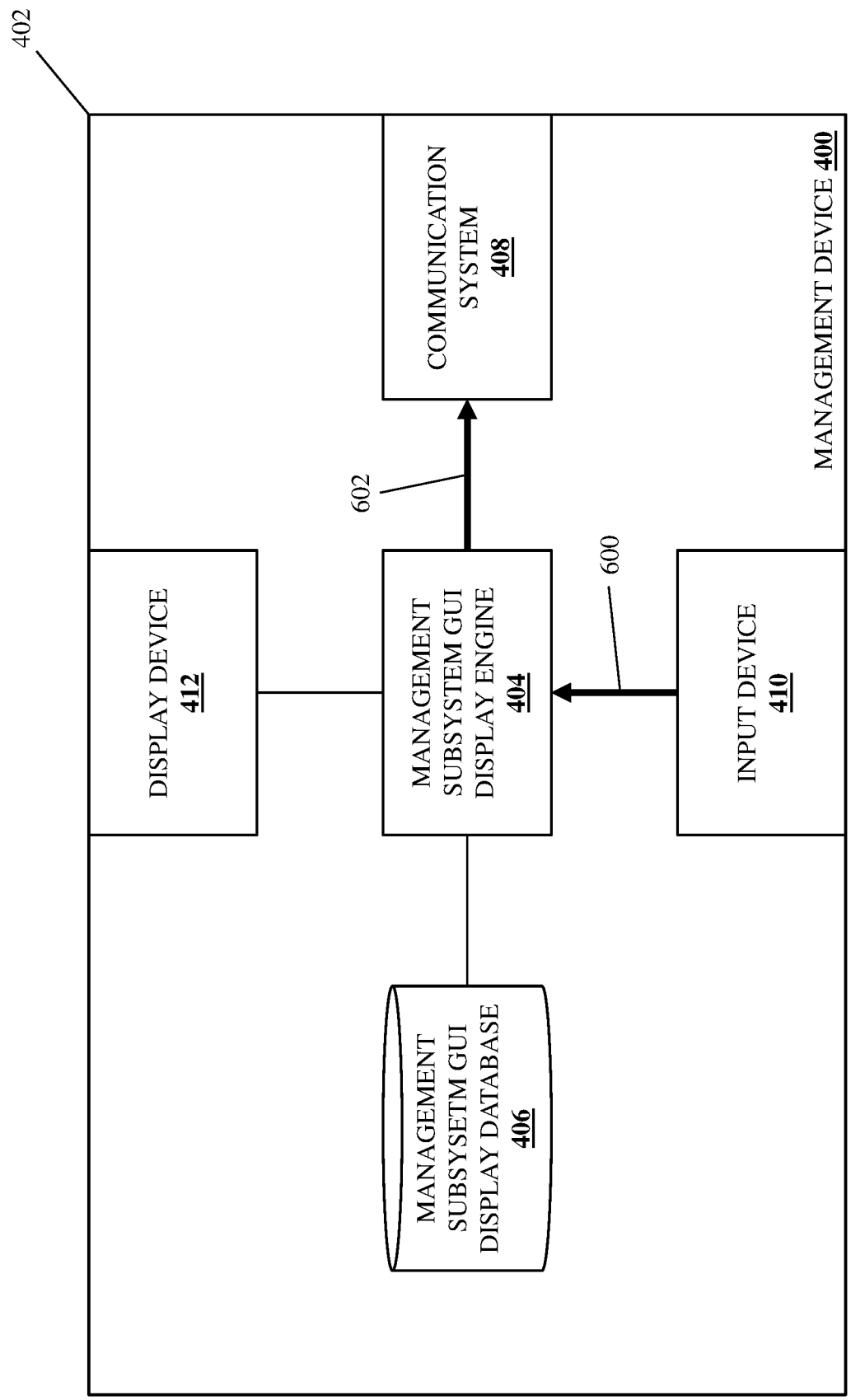

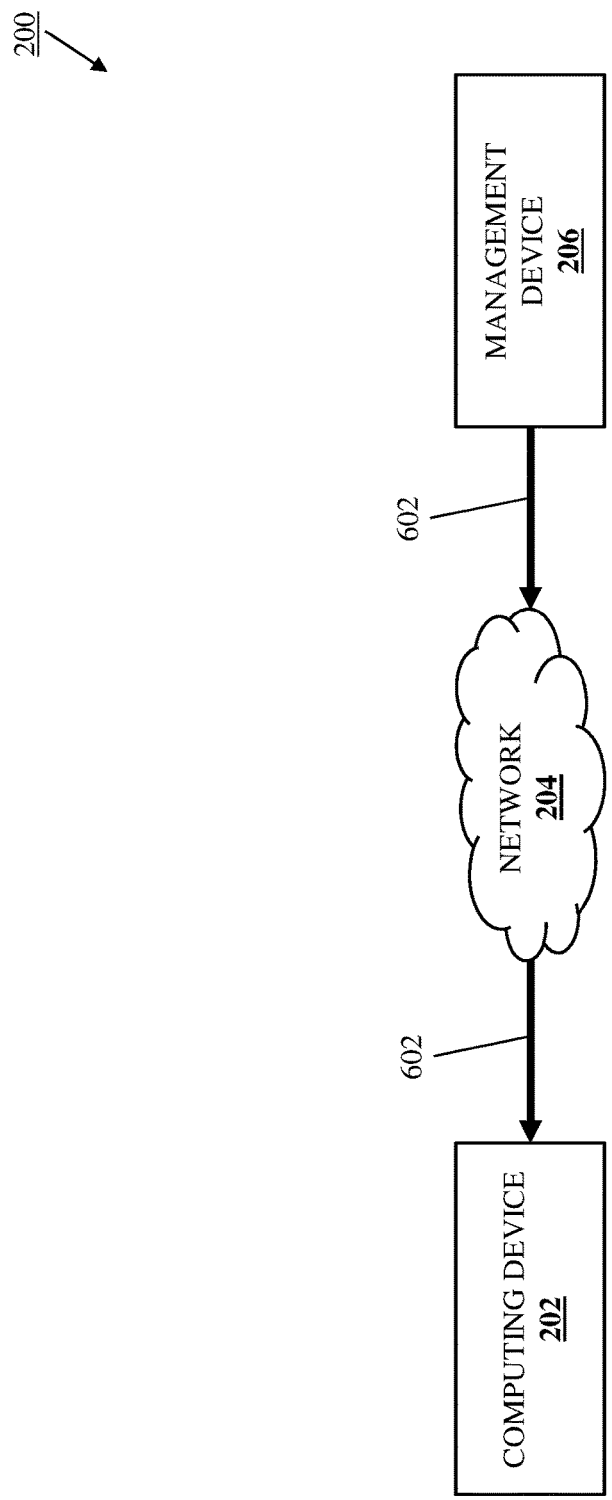

QUICK MANAGEMENT ACTION SYSTEM

BACKGROUND

The present disclosure relates generally to information handling systems, and more particularly to performing quick management actions associated with information handling systems without the need to launch a management subsystem or begin and maintain an active user session.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, often include management subsystems that are used to perform management actions associated with the server device. For example, server devices available from DELL® Inc. of Round Rock, Texas, United States, often include remote access controller devices such as the integrated DELL® Remote Access Controller (iDRAC) that allows remote, out-of-band management access to the server device to perform a variety of management actions that would be apparent to one of skill in the art in possession of the present disclosure. The performance of such management actions is relatively common, and network administrators (or other users) often utilize the remote access controller device to perform management actions associated with the server device many times per day, with some network administrators often performing the same management action repeatedly, which raises some issues.

For example, when the network administrator wishes to perform a management action, they are required to perform multiple operations using a remote access controller Graphical User Interface (GUI) that is provided via the network from the remote access controller device to a management device utilized by the network administrator (e.g., a desktop computing device or laptop/notebook computing device). Those operations include accessing a remote access controller GUI launch page provided by the remote access controller device via the remote access controller GUI, inputting a username and password on the remote access controller GUI launch page and selecting a remote access controller GUI login button to launch the management subsystem and begin an active user session that provides access a remote access controller GUI home page, navigating from the remote access controller GUI home page to a remote access controller GUI management action page that allows the management action to be performed, using the remote access controller GUI management action page to configure the management action and instruct its performance, verifying within the remote access controller GUI that the management action has been performed, and logging out of the remote access controller GUI to end the active user session.

As will be appreciated by one of skill in the art in possession of the present disclosure, the multiple operations described above are time consuming and tedious, particularly when performed repeatedly by the same network administrator, and require remote access controller resources to launch the management subsystem and begin/maintain the active user session, retrieve and transmit information via a network for display via the remote access controller GUI (e.g., on the remote access controller GUI home page and management action pages discussed above), and/or other perform other relatively resource intensive operations that would be apparent to one of skill in the art in possession of the present disclosure. One solution to these issues is to utilize a remote access controller Command Line Interface (CLI), but such solutions require the user to know CLI command and syntax rules which are not user-friendly like the remote access controller GUI, and require the user to install and utilize a CLI management application on their management device.

Accordingly, it would be desirable to provide management action system that addresses the issues discussed above.

SUMMARY

According to one embodiment, an Information Handling System (IHS) includes a management subsystem including a processing system; and a memory system that is coupled to the processing system and that includes instructions that, when executed by the processing system, cause the processing system to provide a management engine that is configured to: provide, for display on a management device, a management subsystem Graphical User Interface (GUI) launch page; receive, from the management device via the management subsystem GUI launch page, credentials and an identification of a management action associated with the IHS and, automatically while the management subsystem GUI launch page is provided for display on the management device: authenticate the credentials; authorize the management action based on the credentials; perform, in response to authenticating the credentials and authorizing the management action, the management action; and provide, for display on the management subsystem GUI launch page in response to performing the management action, information associated with a result of the performance of the management action.

BRIEF DESCRIPTION OF THE DRAWINGS

FIG. 6A is a schematic view illustrating an embodiment of the management device of FIG. 4 operating during the method of FIG. 5.

FIG. 6B is a schematic view illustrating an embodiment of the networked system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
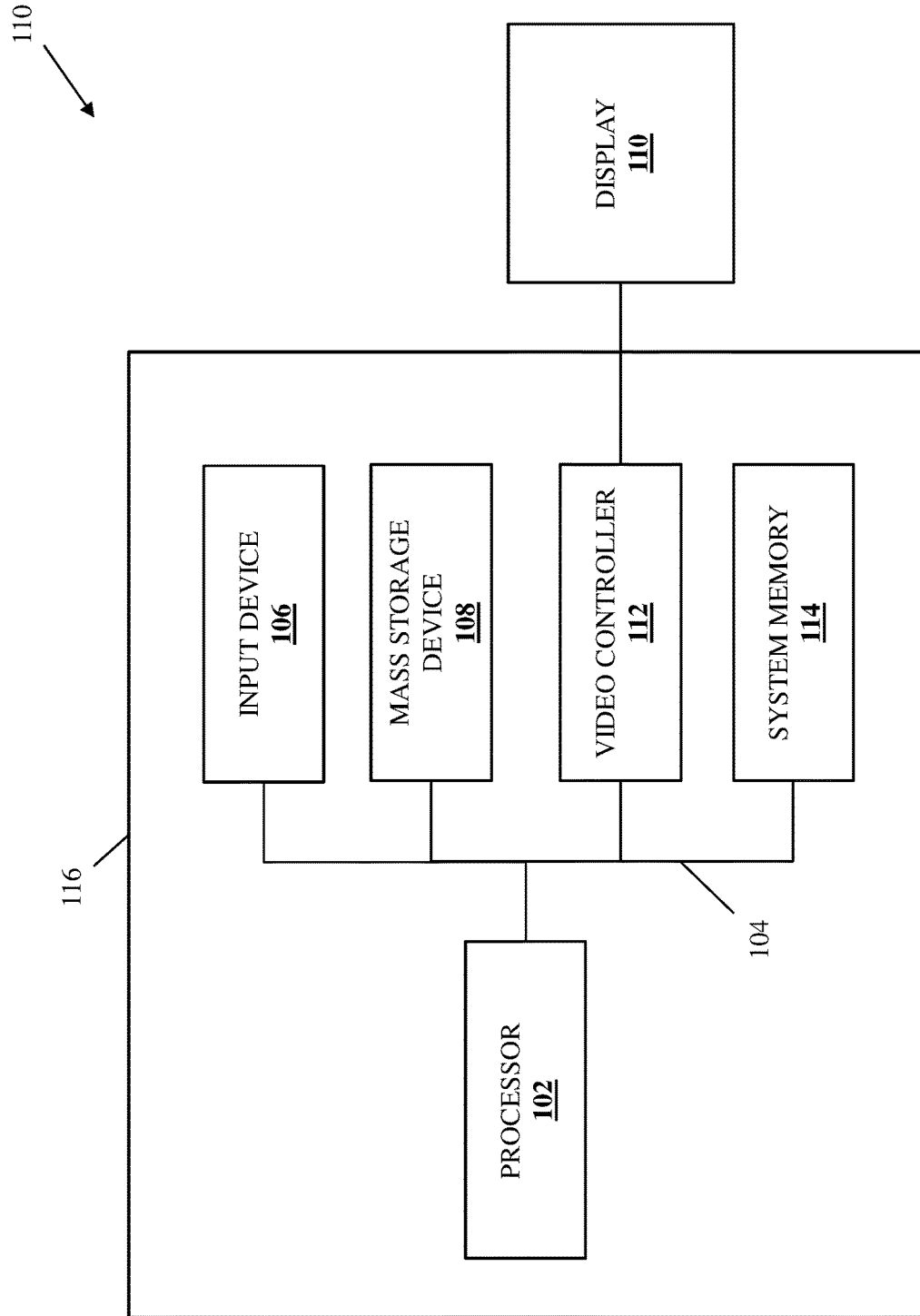
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
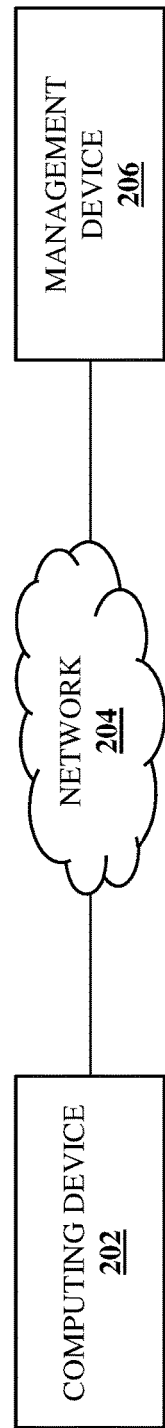
FIG. 2 is a schematic view illustrating an embodiment of a networked system that may provide the quick management action system of the present disclosure.

Referring now to FIG. 2, an embodiment of a networked system 200 is illustrated that may provide the quick management action system of the present disclosure. In the illustrated embodiment, the networked system 200 includes a computing device 202. In an embodiment, the computing device 202 may be provided by the IHS 100 discussed above with reference to FIG. 1, and/or may include some or all of the components of the IHS 100, and in the specific examples discussed below may be provided by a server device. However, while illustrated and discussed as being provided by a server device, one of skill in the art in possession of the present disclosure will recognize that computing devices provided in the networked system 200 may include any devices that may be configured to operate similarly as the computing device 202 discussed below.

As illustrated, the computing device 202 may be coupled to a network 204 that may be provided by a Local Area Network (LAN), the Internet, combinations thereof, and/or other networks that would be apparent to one of skill in the art in possession of the present disclosure. Furthermore, a management device 206 may be coupled via the network 204 to the computing device 202. However, while the management device 206 is illustrated and described herein as being coupled to the computing device 202 via the network 204, one of skill in the art in possession of the present disclosure will recognize how the management device 206 may instead by cabled directly to the computing device 202 while remaining within the scope of the present disclosure as well. In an embodiment, the management device 206 may be provided by the IHS 100 discussed above with reference to FIG. 1, and/or may include some or all of the components of the IHS 100, and in the specific examples discussed below may be provided by a desktop computing device, a laptop/notebook computing device, a tablet computing device, a mobile phone, and/or other management devices that would be apparent to one of skill in the art in possession of the present disclosure. However, while illustrated and discussed as being provided by particular computing devices, one of skill in the art in possession of the present disclosure will recognize that management devices provided in the networked system 200 may include any devices that may be configured to operate similarly as the management device 206 discussed below. Furthermore, while a specific networked system 200 has been illustrated and described, one of skill in the art in possession of the present disclosure will recognize that the quick management action system of the present disclosure may be provided using a variety of components and component configurations while remaining within the scope of the present disclosure as well.

Figure 3:
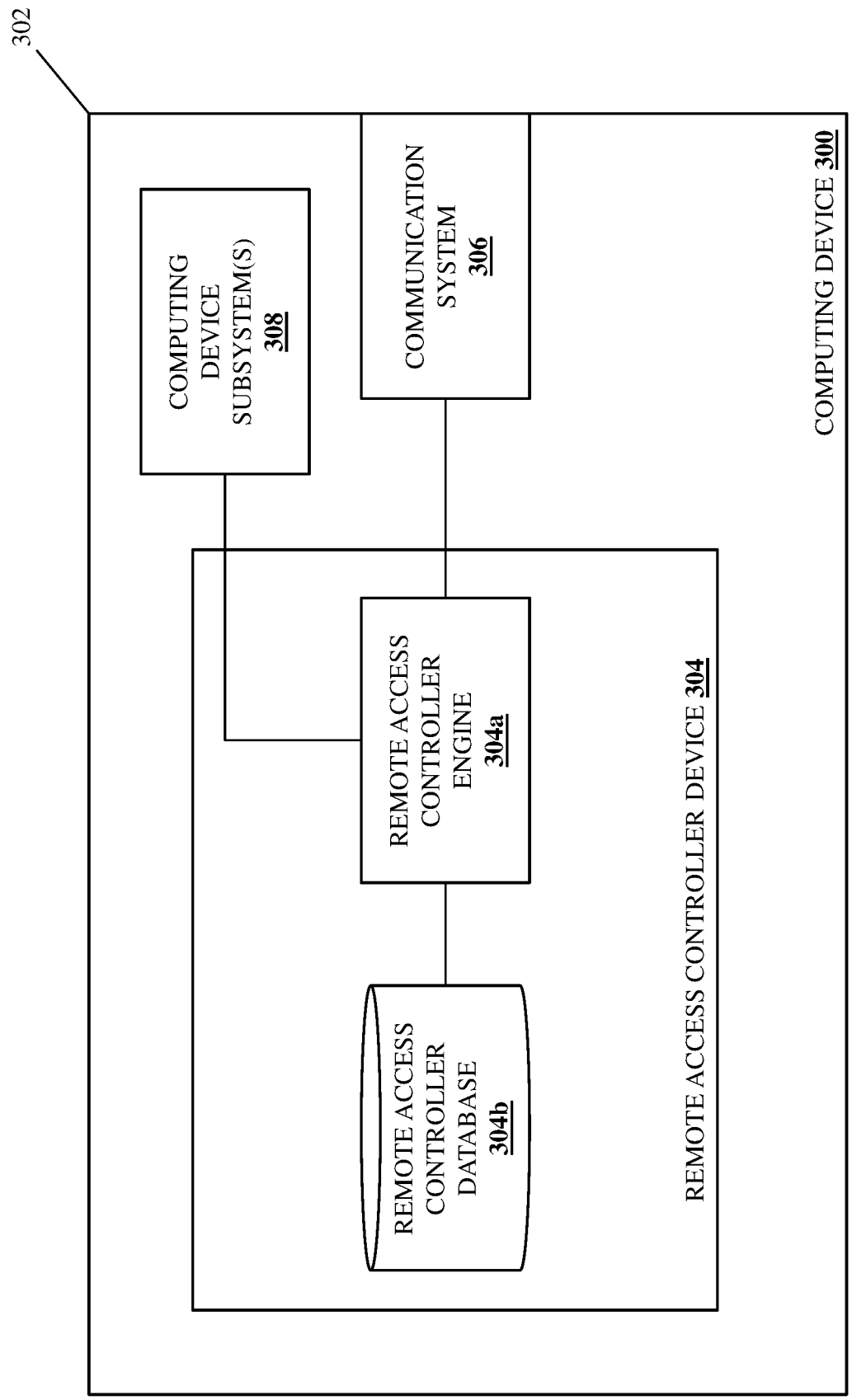
FIG. 3 is a schematic view illustrating an embodiment of a computing device that may be included in the networked system of the FIG. 2.

Referring now to FIG. 3, an embodiment of a computing device 300 is illustrated that may provide the computing device 202 discussed above with reference to FIG. 2. As such, the computing device 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 300 discussed below may be provided by other devices that are configured to operate similarly as the computing device 300 discussed below. In the illustrated embodiment, the computing device 300 includes a chassis 302 that houses the components of the computing device 300, only some of which are illustrated and discussed below. For example, the chassis 302 may house a management subsystem that, in the embodiments illustrated and discussed below, is provided by a remote access controller device 304 that may be provided by an integrated DELL® Remote Access Controller (iDRAC) included in server devices available from DELL® Inc. of Round Rock, Texas, United States; a Baseboard Management Controller (BMC); and/or other remote access controller devices that would be apparent to one of skill in the art in possession of the present disclosure. However, while illustrated and discussed as being provided by a remote access controller device, one of skill in the art in possession of the present disclosure will appreciate how the management subsystem in the computing device 300 may be provided by other management subsystems while remaining within the scope of the present disclosure as well.

In the illustrated embodiment, the remote access controller device 304 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a remote access controller engine 304a that is configured to perform the functionality of the remote access controller engines, management engines, remote access controller devices, and/or management subsystems discussed below. As will be appreciated by one of skill in the art in possession of the present disclosure, the remote access controller engine 304a may be provided by firmware (e.g., iDRAC® firmware), software, and/or other logic known in the art. The remote access controller device 304 may also house a storage system (not illustrated, but which may include the storage 108 discussed above with reference to FIG. 1) that is coupled to the remote access controller engine 304a (e.g., via a coupling between the storage system and the processing system) and that includes a remote access controller database 304b that is configured to store any of the information utilized by the remote access controller engine 304a discussed below.

The chassis 302 may also house a communication system 306 that is coupled to the remote access controller engine 304a (e.g., via a coupling between the communication system 306 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As will be appreciated by one of skill in the art in possession of the present disclosure, the communication system 306 may provide an out-of-band network connection to the remote access controller device 304 (e.g., via the network 204 for the management device 206), although in-band network connection and/or other connections to the remote access controller device 304 will fall within the scope of the present disclosure as well. The chassis 302 may also house one or more computing device subsystems 308 that may be coupled to the remote access controller engine 304a (e.g., via a coupling between the computing device subsystem(s) 308 and the processing system in the remote access controller device 304), and that may include processing subsystems (e.g., Central Processing Units (CPUs)), memory subsystems, storage subsystems, networking subsystems, and/or any other computing device subsystems that would be apparent to one of skill in the art in possession of the present disclosure. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
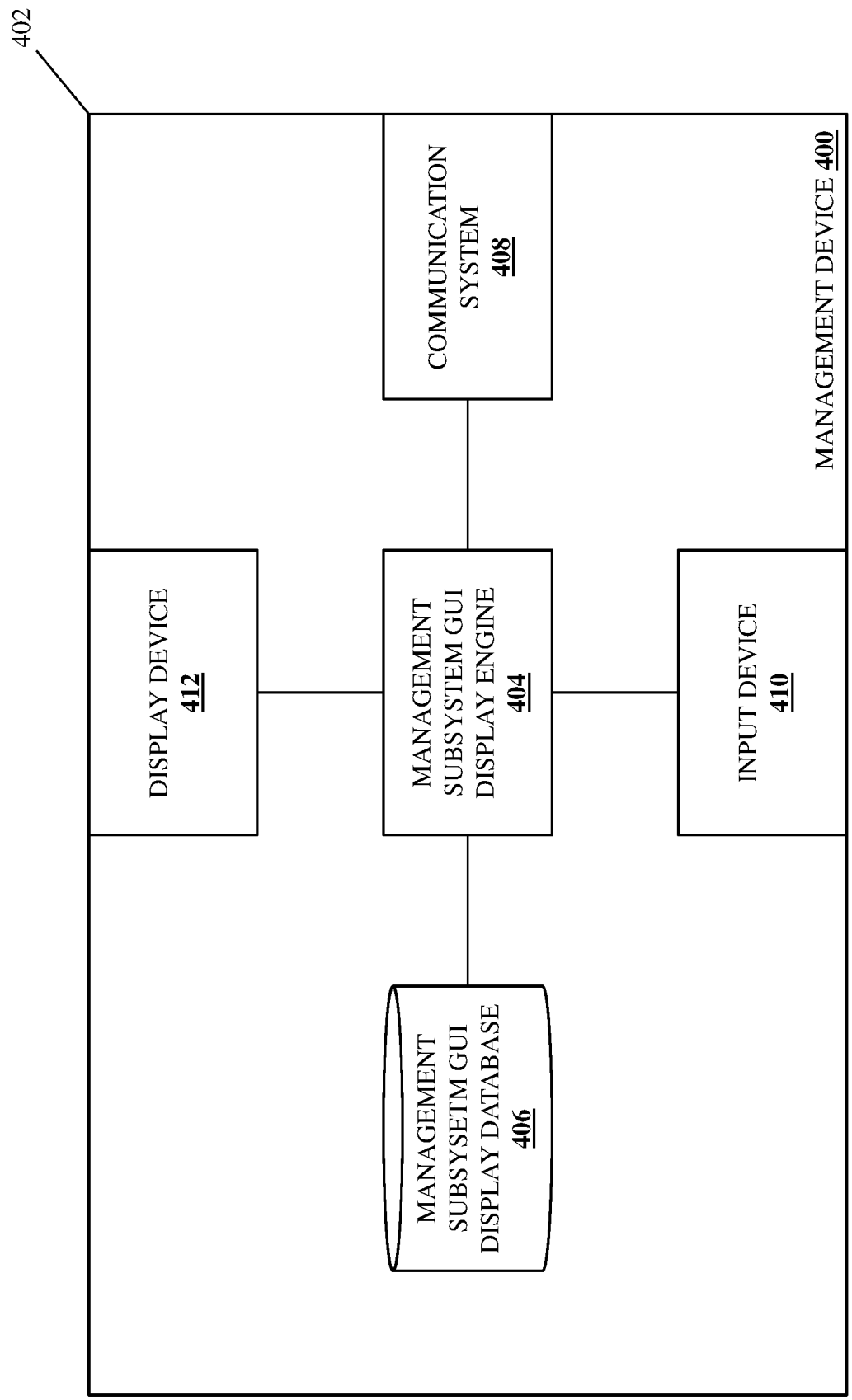
FIG. 4 is a schematic view illustrating an embodiment of a management device that may be included in the networked system of the FIG. 2.

Referring now to FIG. 4, an embodiment of a management device 400 is illustrated that may provide the management device 206 discussed above with reference to FIG. 2. As such, the management device 400 may be provided by the IHS 100 discussed above with reference to FIG. 1 and/or may include some or all of the components of the IHS 100, and in specific examples may be provided by a desktop computing device, a laptop/notebook computing device, a tablet computing device, a mobile phone, and/or other management devices that would be apparent to one of skill in the art in possession of the present disclosure. However, while illustrated and discussed as being provided by particular computing devices, one of skill in the art in possession of the present disclosure will recognize that the functionality of the management device 400 discussed below may be provided by other devices that are configured to operate similarly as the management device 400 discussed below. In the illustrated embodiment, the management device 400 includes a chassis 402 that houses the components of the management device 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a management subsystem Graphical User Interface (GUI) display engine 404 that is configured to perform the functionality of the management subsystem GUI display engines and/or management devices discussed below.

The chassis 402 may also house a storage system (not illustrated, but which may include the storage 108 discussed above with reference to FIG. 1) that is coupled to the management subsystem GUI display engine 404 (e.g., via a coupling between the storage system and the processing system) and that includes a management subsystem GUI display database 406 that is configured to store any of the information utilized by the management subsystem GUI display engine 404 discussed below. The chassis 402 may also house a communication system 408 that is coupled to the management subsystem GUI display engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

The chassis 402 may also house an input device 410 that is coupled to the management subsystem GUI display engine 304 (e.g., via a coupling between the input device 410 and the processing system) and that may be provided by a keyboard device, a mouse device, and/or any other input components that would be apparent to one of skill in the art in possession of the present disclosure. The chassis 402 may also house a display device 412 that is coupled to the management subsystem GUI display engine 404 (e.g., via a coupling between the display device 412 and the processing system) and that may be provided by an integrated display/monitor (e.g., included in a laptop/notebook computing device, tablet computing device, or mobile phone), an external display/monitor (e.g., connected to a desktop computing device), and/or any other display components that would be apparent to one of skill in the art in possession of the present disclosure. However, while a specific management device 400 has been illustrated and described, one of skill in the art in possession of the present disclosure will recognize that management devices (or other devices operating according to the teachings of the present disclosure in a manner similar to that described below for the management device 400) may include a variety of components and/or component configurations for providing conventional management device functionality, as well as the functionality discussed below, while remaining within the scope of the present disclosure as well.

Figure 5:
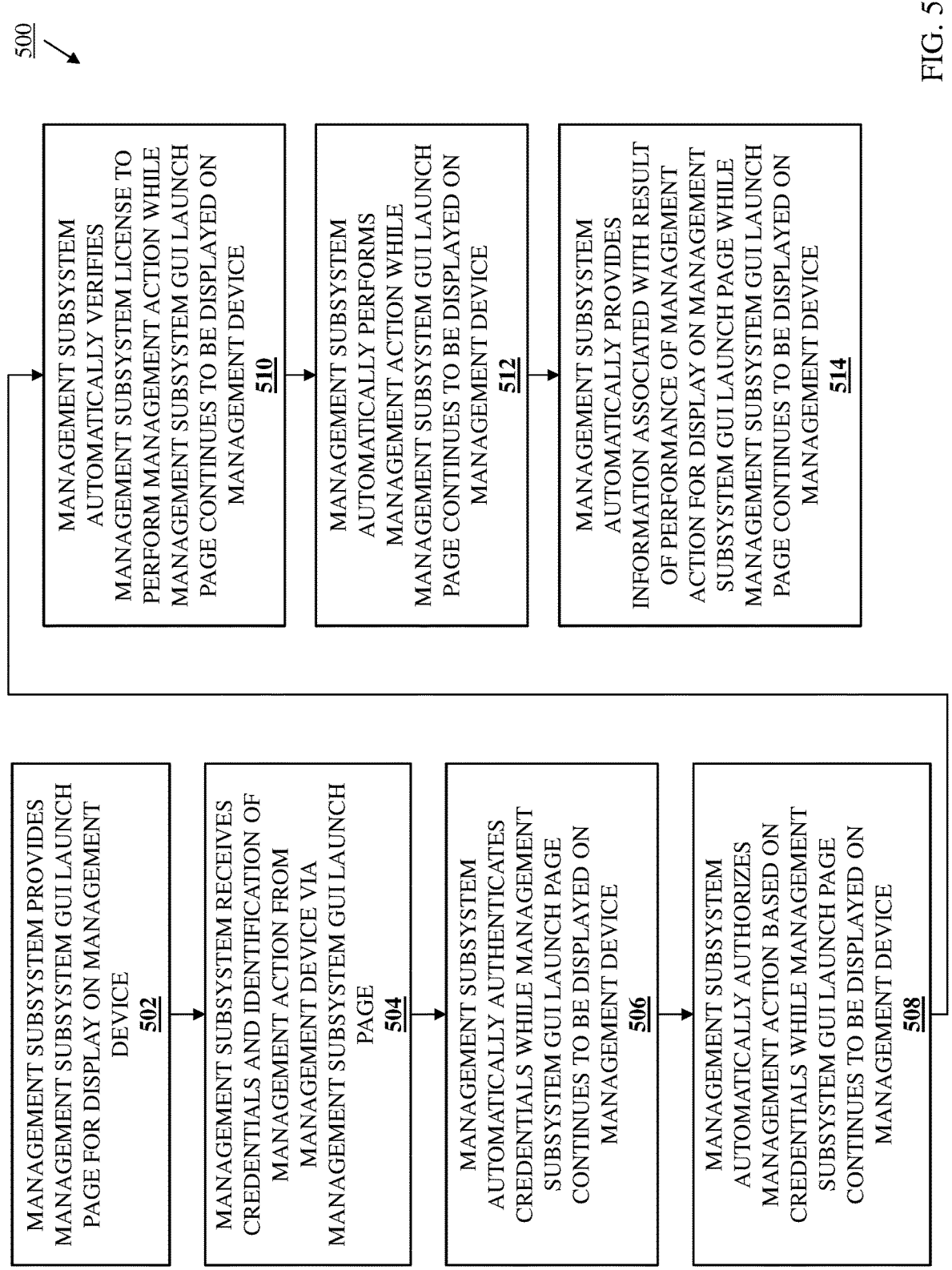
FIG. 5 is a flow chart illustrating an embodiment of a method for performing quick management actions.

Referring now to FIG. 5, an embodiment of a method 500 for performing quick management actions is illustrated. As discussed below, the systems and methods of the present disclosure provide for the performance of management actions from a management subsystem Graphical User Interface (GUI) launch page without the need to launch a management subsystem and/or begin/maintain an active user session. For example, the quick management action system of the present disclosure may include a computing device having a management subsystem that is coupled to a management device. The management subsystem provides a management subsystem GUI launch page for display on the management device, receives credentials and an identification of a management action associated with the computing device from the management device via the management subsystem GUI launch page. The management subsystem then, automatically while the management subsystem GUI launch page is provided for display on the management device, authenticates the credentials, authorizes the management action based on the credentials and, in response, performs the management action, and provides information associated with a result of the performance of the management action for display on the management subsystem GUI launch page. As such, management actions, and particularly management actions that are performed repeatedly by network administrators, may be performed quicker than conventional management subsystems allow while also consuming less management subsystem resources.

Figure 6C:
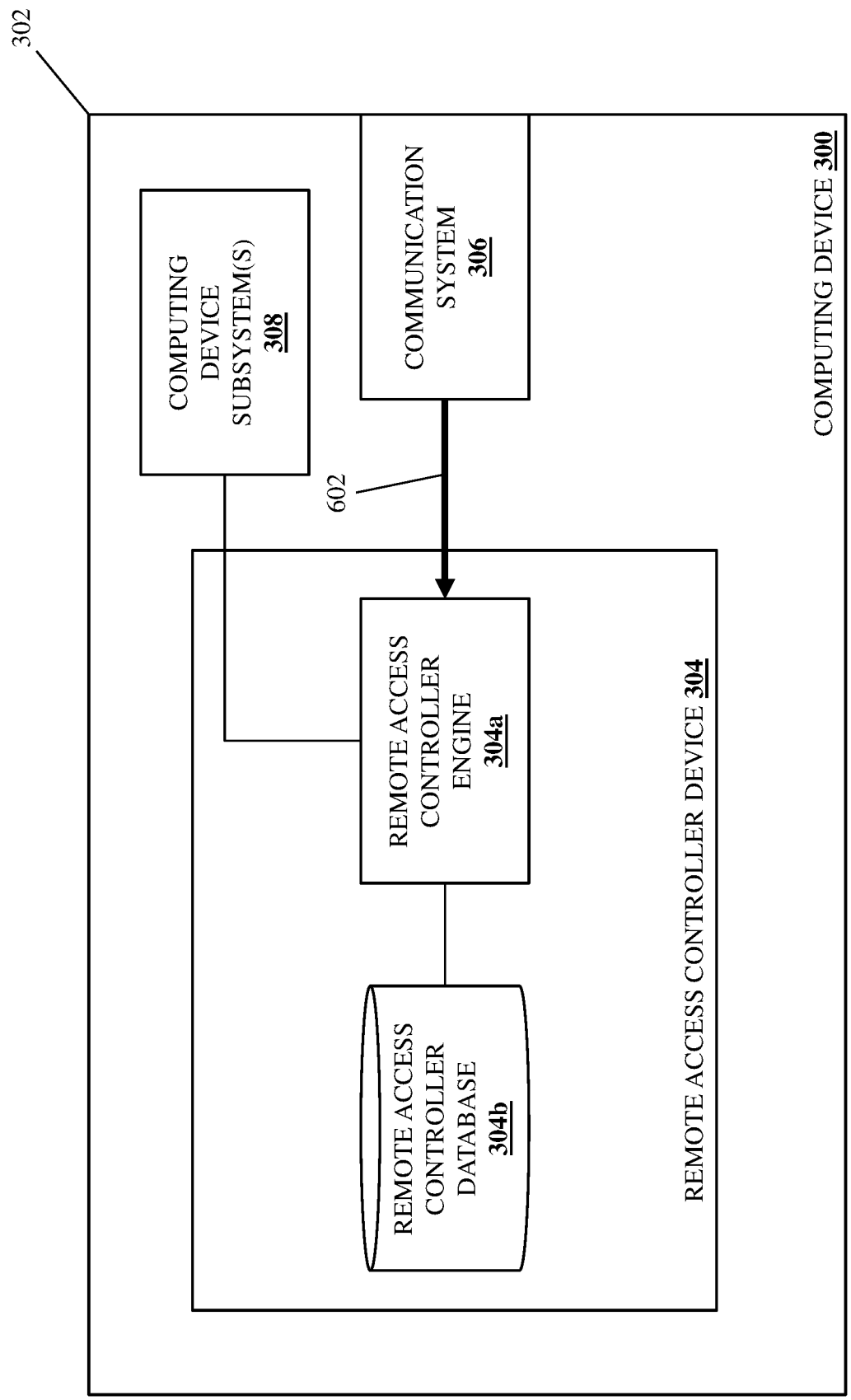
FIG. 6C is a schematic view illustrating an embodiment of the computing device of FIG. 3 operating during the method of FIG. 5.

The method 500 begins at block 502 where a management subsystem provides a management subsystem GUI launch page for display on a management device. With reference to FIGS. 6A, 6B, and 6C, in an embodiment of block 502, a network administrator (or other user) may utilize the input device 410 in order to perform management subsystem GUI launch page request operations 600 that may include using a keyboard device, mouse device, or other input device to provide a request to the management subsystem GUI display engine 404 for a management subsystem GUI launch page. In response, the management subsystem GUI display engine 404 may perform management subsystem GUI launch page communication operations 602 that may include transmitting a management subsystem GUI launch page communication via the communication system 408, through the network 204, and to the computing device 202/300 such that the remote access controller engine 304a in the remote access controller device 304 receives the management subsystem GUI launch page communication via the communication system 306.

Figure 7A:
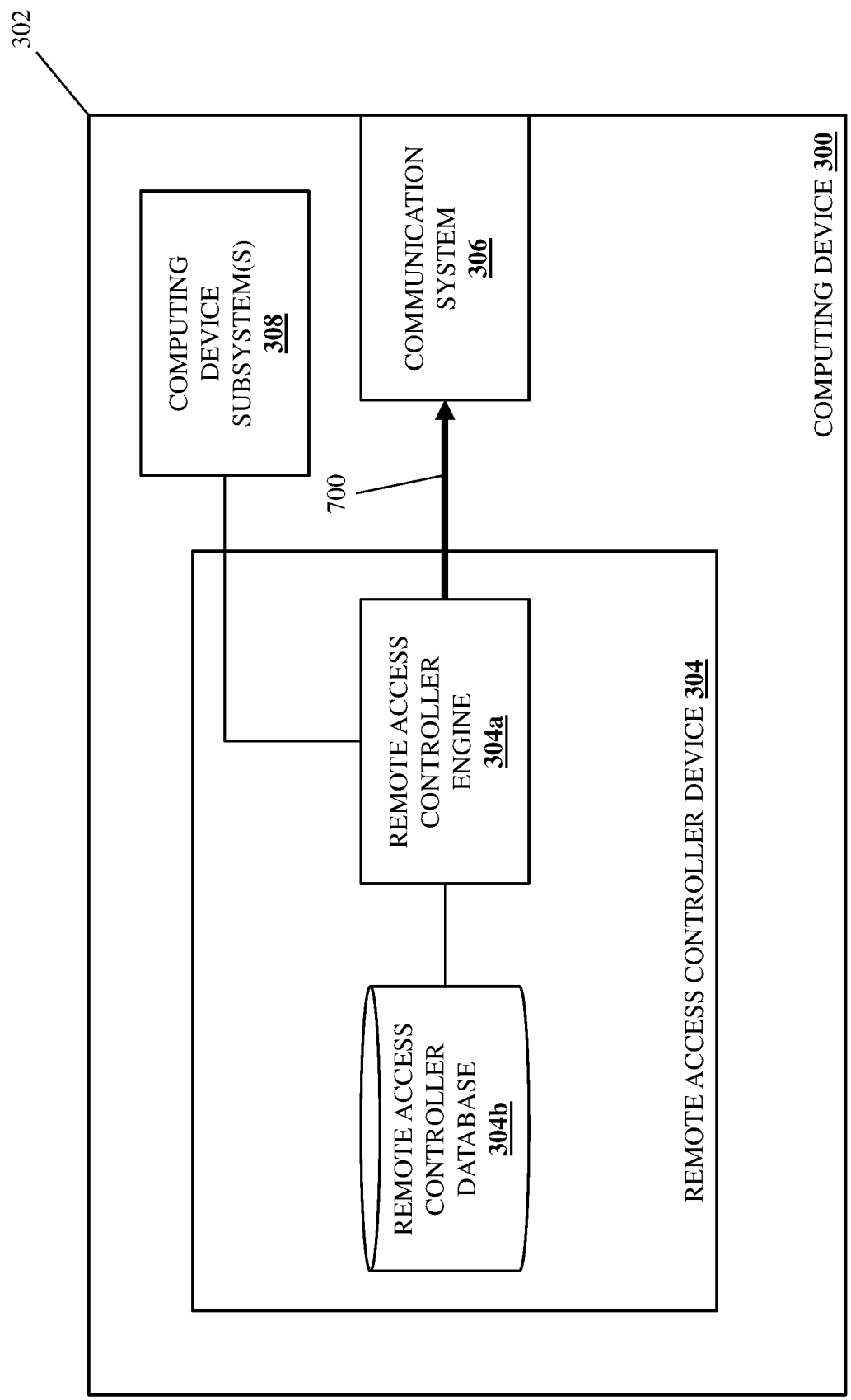
FIG. 7A is a schematic view illustrating an embodiment of the computing device of FIG. 3 operating during the method of FIG. 5.
Figure 7B:
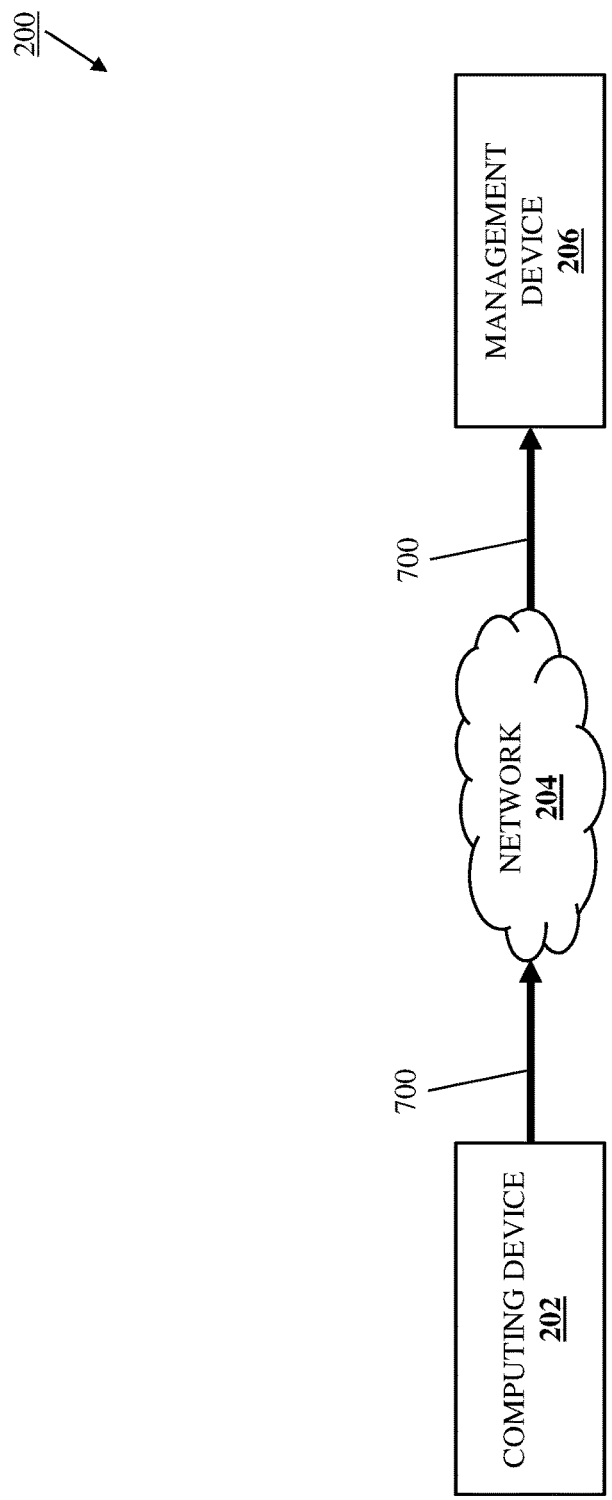
FIG. 7B is a schematic view illustrating an embodiment of the networked system of FIG. 2 operating during the method of FIG. 5.
Figure 7C:
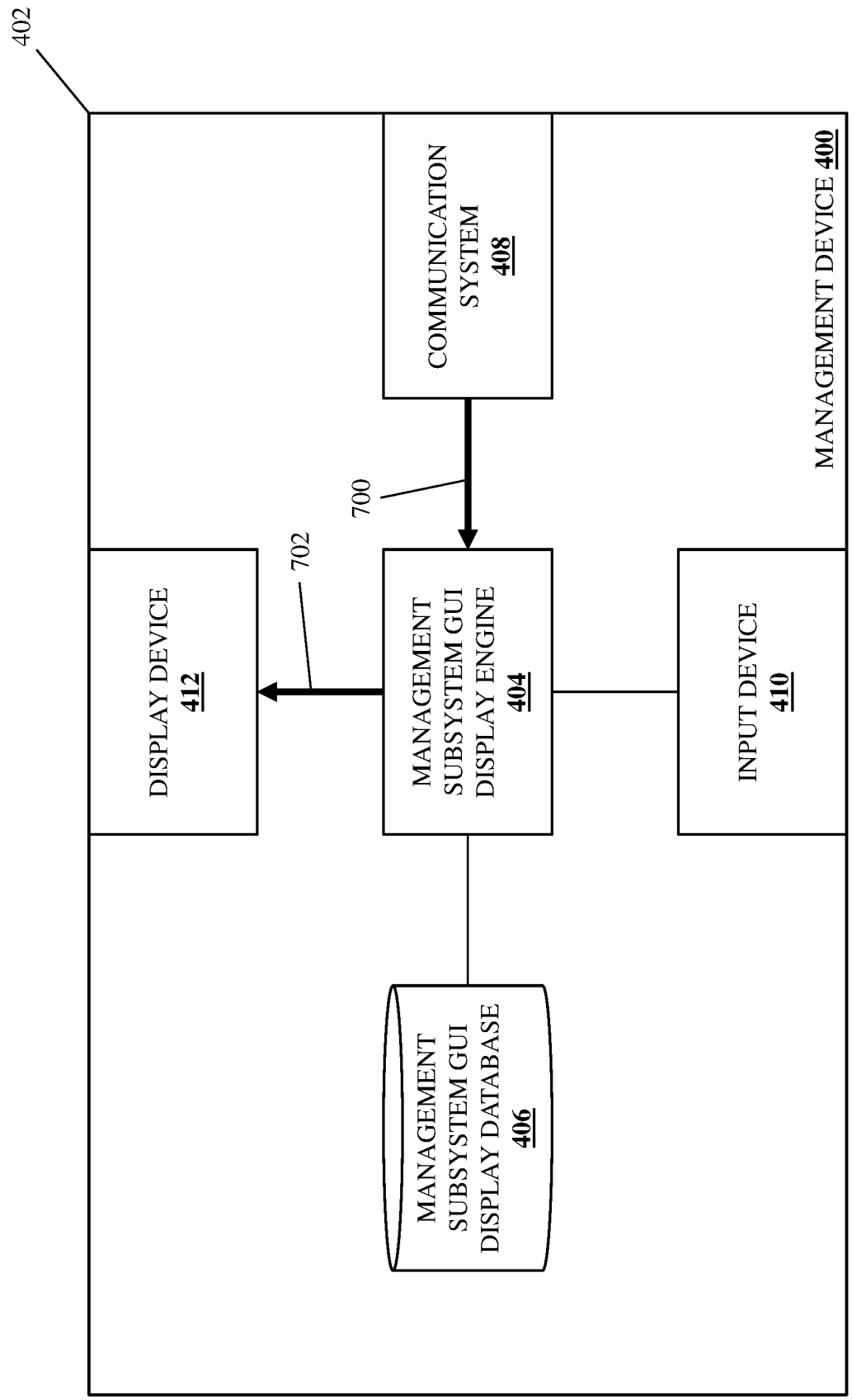
FIG. 7C is a schematic view illustrating an embodiment of the management device of FIG. 4 operating during the method of FIG. 5.

With reference to FIGS. 7A, 7B, and 7C, in an embodiment of block 502 and in response to receiving the management subsystem GUI launch page communication, the remote access controller engine 304*a* in the remote access controller device 304 may perform management subsystem GUI launch page communication operations 700 that may include transmitting a management subsystem GUI launch page communication via the communication system 306, through the network 204, and to the management device 206/400 such that the remote access controller engine 304*a* in the remote access controller device 304 receives the management subsystem GUI launch page communication via the communication system 408. The management subsystem GUI display engine 404 may then perform management subsystem GUI launch page display operations 702 that include displaying a management subsystem GUI launch page on the display device 412, which one of skill in the art in possession of the present disclosure will recognize may include the management subsystem GUI display engine 404 utilizing management subsystem GUI launch page information stored in the management subsystem GUI display database 406.

In a specific example, the management subsystem GUI launch page request operations 600 may include a user providing request for the management subsystem GUI launch page to the management subsystem GUI display engine 404, while the management subsystem GUI launch page communication operations 602 and the management subsystem GUI launch page communication operations 700 may include Secure Sockets Layer (SSL) operations such as an SSL handshake performed between a remote access controller GUI application provided by the management subsystem GUI display engine 404 and a web server provided by the remote access controller engine 304*a* in order to, for example, secure the communication channel in order to provide privacy and data integrity for subsequent communications between the remote access controller GUI application provided by the management subsystem GUI display engine 404 and the web server provided by the remote access controller engine 304*a* using the management subsystem GUI launch page as discussed below.

As such, one of skill in the art in possession of the present disclosure will appreciate how the management subsystem GUI launch page communication operations 602 and the management subsystem GUI launch page communication operations 700 discussed above may allow the remote access controller engine 304*a* in the remote access controller device 304 to provide management subsystem GUI launch page for display on the management device 400 by, for example, establishing the secure communication channel for the management subsystem GUI launch page, transmitting at least some of the information used by the management subsystem GUI display engine 404 to display the management subsystem GUI launch page, and/or otherwise assisting in the display of the management subsystem GUI launch page via other operations that would be apparent to one of skill in the art in possession of the present disclosure. However, while specific operations have been illustrated and described, one of skill in the art in possession of the present disclosure will appreciate how the management subsystem GUI launch page may be displayed on the management device 206/400 in a variety of manners that will fall within the scope of the present disclosure as well.

Figure 8:
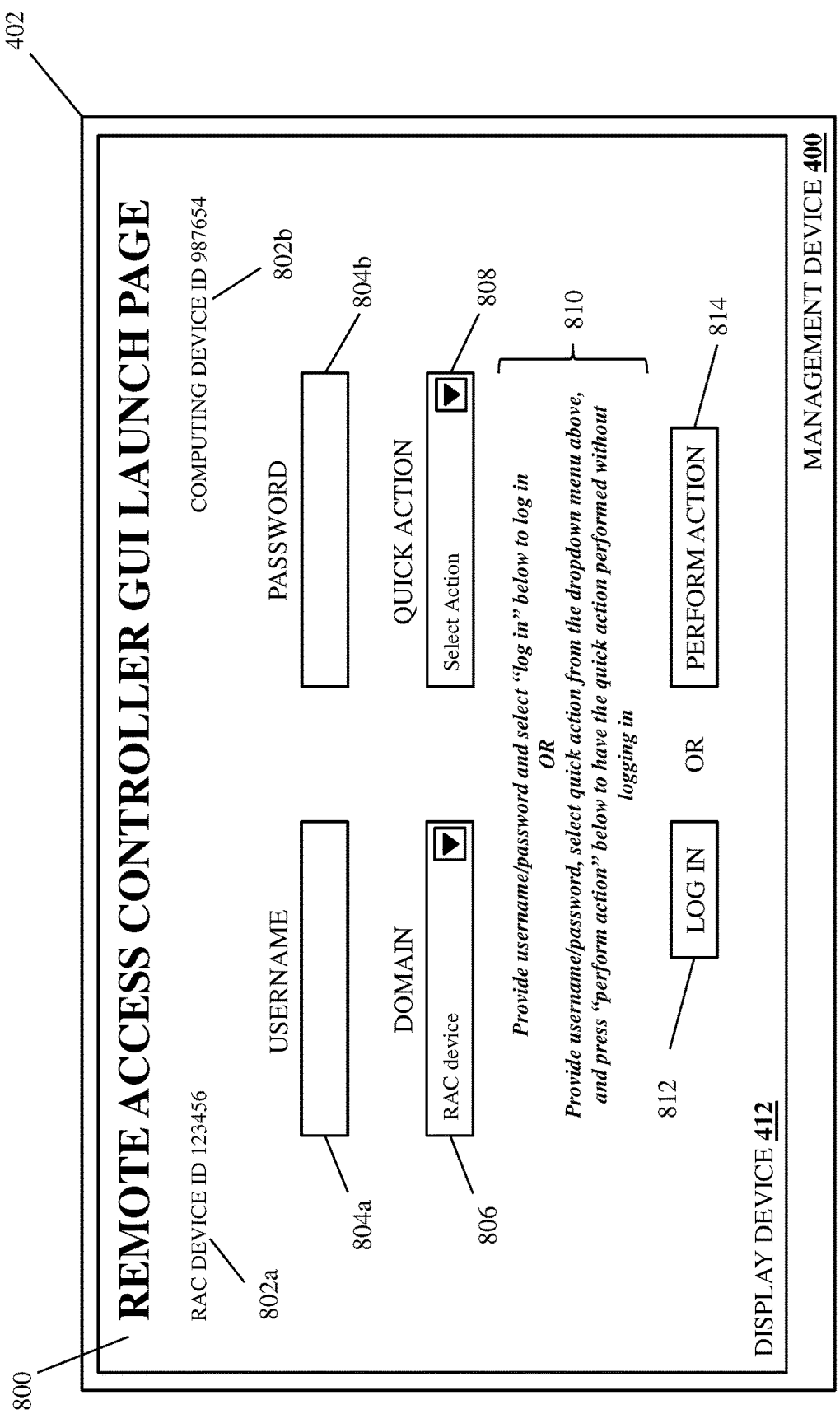
FIG. 8 is a screen shot view illustrated an embodiment of a management subsystem GUI launch page displayed on the management device 400 of FIG. 4 during the method of FIG. 5.

With reference to FIG. 8, an embodiment of a remote access controller GUI launch page 800 is illustrated that provides an example of the management subsystem GUI launch page that may be displayed on the display device 412 of the management device 400 by the management subsystem GUI display engine 404 at block 502 (e.g., with the assistance of the remote access controller engine 304*a* in the remote access controller device 304 as discussed above). In the illustrated embodiment, the remote access controller GUI launch page 800 includes a remote access controller identifier 802*a* that identifies the remote access controller device 304, and a computing device identifier 802*b* that identifies the computing device 202/300. Furthermore, the remote access controller GUI launch page 800 also includes at least one credential element that, in the illustrated example, include a username credential element 804*a* and a password credential element 804*b* that one of skill in the art in possession of the present disclosure will appreciate may be configured to receive username and password credentials. However, while particular credential elements configured to receive particular credentials are illustrated and described, one of skill in the art in possession of the present disclosure will appreciate how other credential elements configured to receive other credentials (e.g., biometric credentials, multi-factor authentication credentials, etc.) will fall within the scope of the present disclosure as well.

The remote access controller GUI launch page 800 also includes a domain element 806 that one of skill in the art in possession of the present disclosure will recognize provides for the selection of a domain (e.g., via a "dropdown" feature in the domain element 806), and while a particular domain (a domain for the remote access controller device 304) is illustrated as being selected via the domain element 806 in the examples provided herein, other domains are envisioned as falling within the scope of the present disclosure as well. The remote access controller GUI launch page 800 also includes a management action select element 808 (identified as a "quick action" in FIG. 8) that one of skill in the art in possession of the present disclosure will recognize provides for the selection of a management action (e.g., via a "dropdown" feature in the management action select element 808) as discussed below. Furthermore, while the management action select element 808 is illustrated and described below as providing for the selection/identification of a single management action, one of skill in the art in possession of the present disclosure will appreciate how the remote access controller GUI launch page 800 and/or management action select element 808 may be modified to provide for the selection of multiple management actions while remaining within the scope of the present disclosure as well.

The remote access controller GUI launch page 800 also includes an information section 810 that is illustrated as providing instructions on how to either log in to the management subsystem/remote access controller device 304 (e.g., "Provide username/password and select 'log in' below to log in"), or perform the quick management actions of the present disclosure (e.g., "Provide username/password, select quick action from the dropdown menu above, and press 'perform action' below to have the quick action performed without logging in"), but one of skill in the art in possession of the present disclosure will recognize how the information section 810 may be utilized to display any of a variety of information, just a few examples of which are illustrated and described below. The remote access controller GUI launch page 800 also includes a log in element 812 that one of skill in the art in possession of the present disclosure will recognize is configured to be selected to log a user in to the management subsystem/remote access controller device 304, and a perform action element 814 that one of skill in the art in possession of the present disclosure will recognize is configured to be selected to perform the quick management actions of the present disclosure. However, while a specific example of a management subsystem/remote access controller GUI launch page 800 is illustrated and described herein, one of skill in the art in possession of the present disclosure will appreciate how other configurations of management subsystem/remote access controller GUI launch pages will fall within the scope of the present disclosure as well.

Figure 9A:
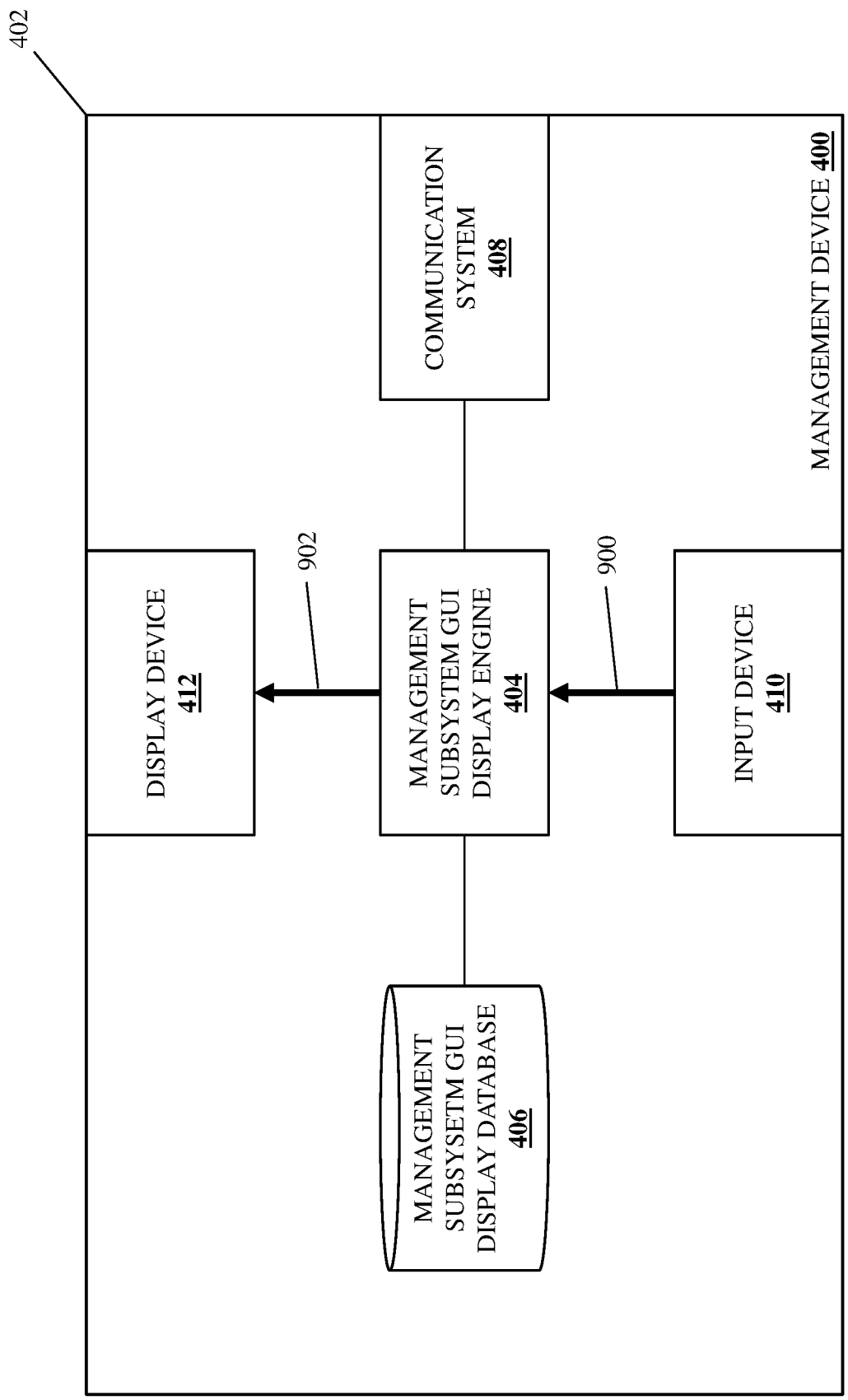
FIG. 9A is a schematic view illustrating an embodiment of the management device of FIG. 4 operating during the method of FIG. 5.

The method 500 then proceeds to block 504 where the management subsystem receives credentials and identification of a management action from the management device via the management subsystem GUI launch page. With reference to FIG. 9A, in an embodiment of block 504, the network administrator (or other user) may utilize the input device 410 in order to perform management subsystem GUI launch page credential provisioning/management action selection/management action performance instruction operations 900 that may include using a keyboard device, mouse device, or other input device to provide credentials, select a management action, and instruct the performance of the selected management action via the management subsystem GUI launch page being displayed by the management subsystem GUI display engine 404 on the display device 412. As would be understood by one of skill in the art in possession of the present disclosure, the management subsystem GUI launch page credential provisioning/management action selection/management action performance instruction operations 900 may cause the management subsystem GUI display engine 404 to perform management subsystem GUI launch page update operations 902 to update the display of the management subsystem GUI launch page as discussed below.

Figure 9B:
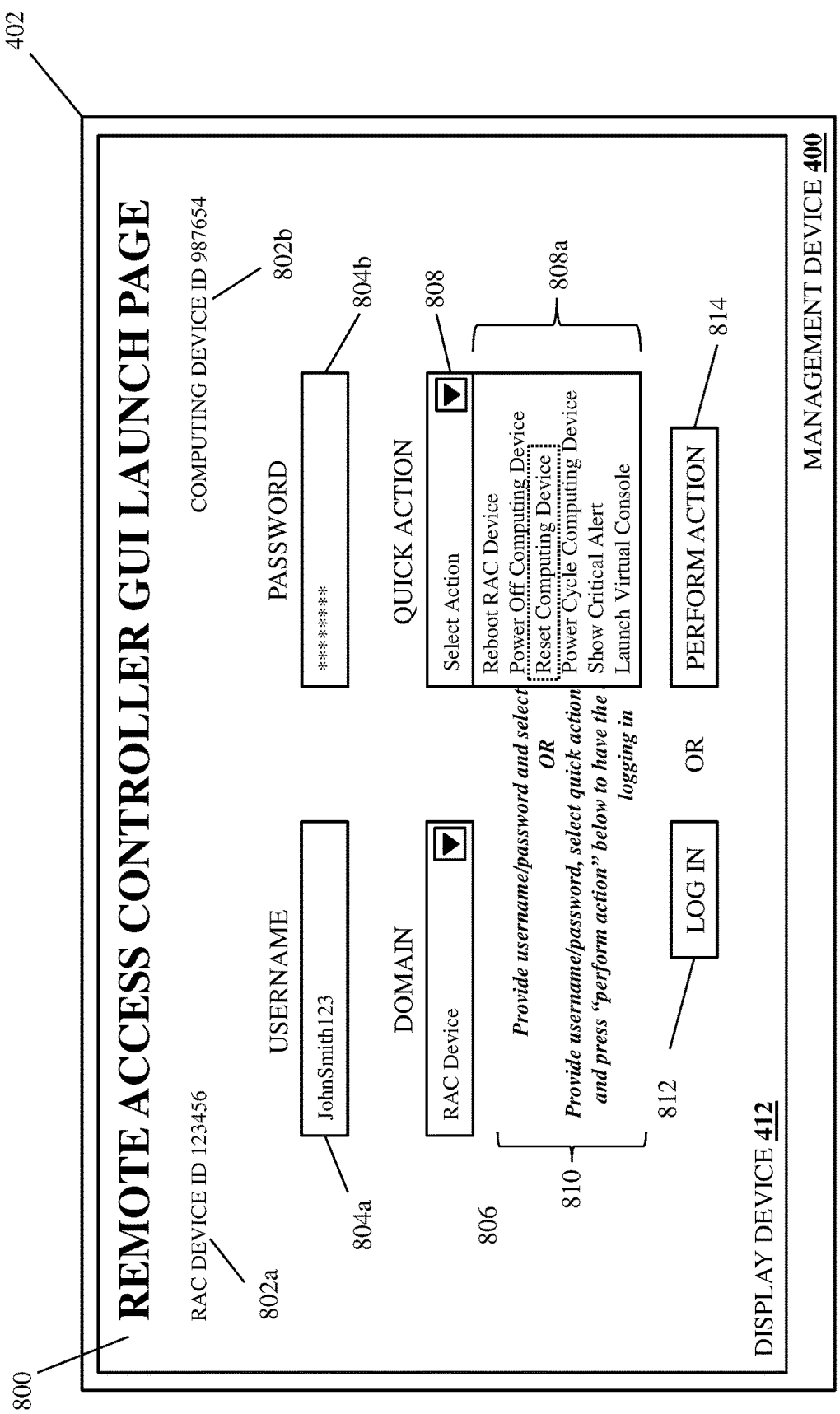
FIG. 9B is a screen shot view illustrated an embodiment of the management subsystem GUI launch page of FIG. 8 being utilized on the management device 400 of FIG. 4 during the method of FIG. 5.

With reference to FIG. 9B, the management subsystem GUI launch page credential provisioning/management action selection/management action performance instruction operations 900 may include the network administrator (or other user) utilizing the input device 410 to provide a username credential (e.g., "JohnSmith123" in the illustrated example) in the username credential element 804*a* on the management subsystem GUI launch page 800, and a password credential (e.g., "******" to indicate an obscured password in the illustrated example) in the password credential element 804***b* on the management subsystem GUI launch page 800. With continued reference to FIG. 9B, the management subsystem GUI launch page credential provisioning/management action selection/management action performance instruction operations 900 may also include the network administrator (or other user) utilizing the input device 410 to select a management action (e.g., "Reset Computing Device" in the illustrated example) in the management action select element 808 on the management subsystem GUI launch page 800. However, as discussed above, while a single management action is illustrated and described as being selected/identified, the selection and identification of multiple management actions at block 504 (e.g., via a modified management subsystem GUI launch page 800 and/or management action select element 808) is envisioned as falling within the scope of the present disclosure as well.

In the specific example provided in FIG. 9B, the management action select element 808 includes a "dropdown" feature that a network administrator (or other user) may utilized (e.g., using the input device 410) in order to be presented with a management action list 808*a* that includes a plurality of management actions that are associated with the computing device 300 and that may be selected and identified via the management action select element 808. In the specific example provided in FIG. 9B, the management actions include rebooting the remote access controller device 304 (e.g., "Reboot RAC Device"), powering off the computing device 202/300 (e.g., "Power Off Computing Device"), resetting/"warm booting" the computing device 202/300 (e.g., "Reset Computing Device"), power cycling/"cold booting" the computing device 202/300 (e.g., "Power Cycle Computing Device"), showing critical alerts (e.g., "Show Critical Alert"), and launching a virtual console (e.g., "Launch Virtual Console"), although one of skill in the art in possession of the present disclosure will appreciate how other management actions will fall within the scope of the present disclosure as well.

In some embodiments, the plurality of management actions available via the management action select element 808 may be prepopulated based on those management actions being the most commonly utilized management actions selected/identified by a plurality of network administrators (or other users) of remote access controller devices and/or computing devices that are similar to the remote access controller device 304 and/or computing device 202/300. However, in other embodiments, at least some of the plurality of management actions available via the management action select element 808 may be custom management actions that may be defined by the network administrator (or other user) using customer management action definition techniques like those discussed in further detail below with reference to FIG. 14.

Furthermore, in yet other embodiments, at least some of the plurality of management actions available via the management action select element 808 may be learned by the remote access controller engine 304*a* in the remote access controller device 304. For example, the remote access controller engine 304*a* in the remote access controller device 304 may associate (e.g., in the remote access controller database 304*b*) management actions performed by network administrators or other users (e.g., based on the credentials used to perform those management actions, discussed in further detail below), which may result in the association of a plurality of management actions with any particular network administrator or other user. As such, the remote access controller engine 304*a* in the remote access controller device 304 may include a machine learning algorithms or other logic to analyze a plurality of management actions associated with any particular network administrator or other user in the remote access controller database 304*b*, as well as permissions, roles, and requirements of network administrators or other users, and identify and/or prioritize some or all of those management actions as management actions that will be provided via the management action select element 808 for selection/identification.

As such, in some embodiments, the management actions included for selection/identification via the management action select element 808 may differ for different network administrators or other users, and may dynamically change as the use of the remote access controller device 304/management subsystem by the network administrator or other user changes, and may be dynamically generated for presentment to the network administrator (or other user) via the management subsystem GUI launch page. For example, in response to the network administrator (or other user) providing credentials in the username credential element 840*a* and/or the password credential element 804*b* (e.g., prior to selecting the perform action element 814, discussed in further detail below), the management subsystem GUI display engine 404 may transmit those credentials via the network 204 to the remote access controller engine 304a, which allows the remote access controller engine 304a to identify management actions associated with those credentials, and provide those identified management actions via the network 204 and back to the management subsystem GUI display engine 404 so that they may be presented to the network administrator (or other user) as discussed above. However, while several examples of providing a plurality of management actions for selection via the management action select element 808 have been provided, one of skill in the art in possession of the present disclosure will appreciate how management actions may be provided for selection via the management subsystem GUI launch page in a variety of manners that will fall within the scope of the present disclosure as well.

Figure 9C:
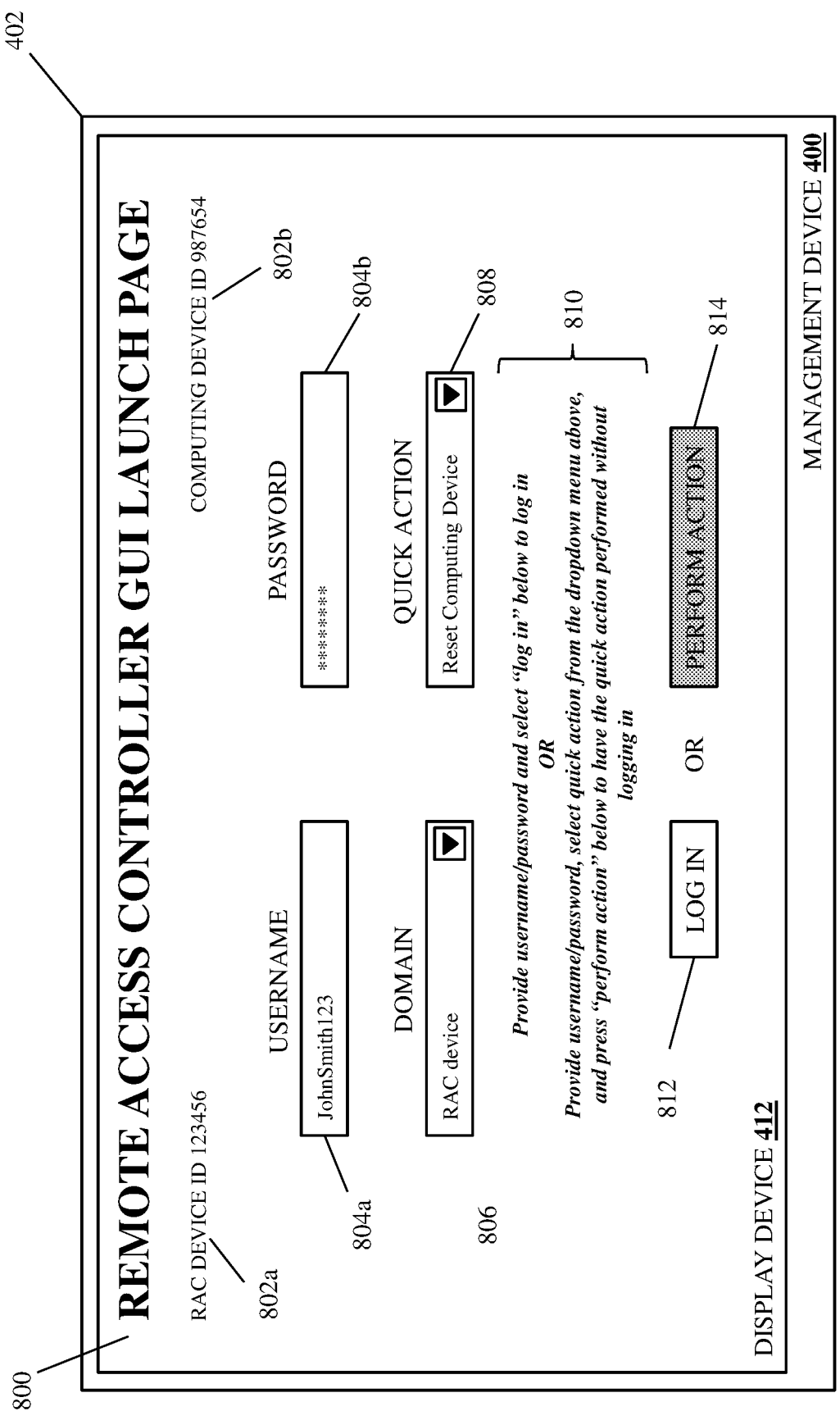
FIG. 9C is a screen shot view illustrated an embodiment of the management subsystem GUI launch page of FIG. 8 being utilized on the management device 400 of FIG. 4 during the method of FIG. 5.
Figure 10A:
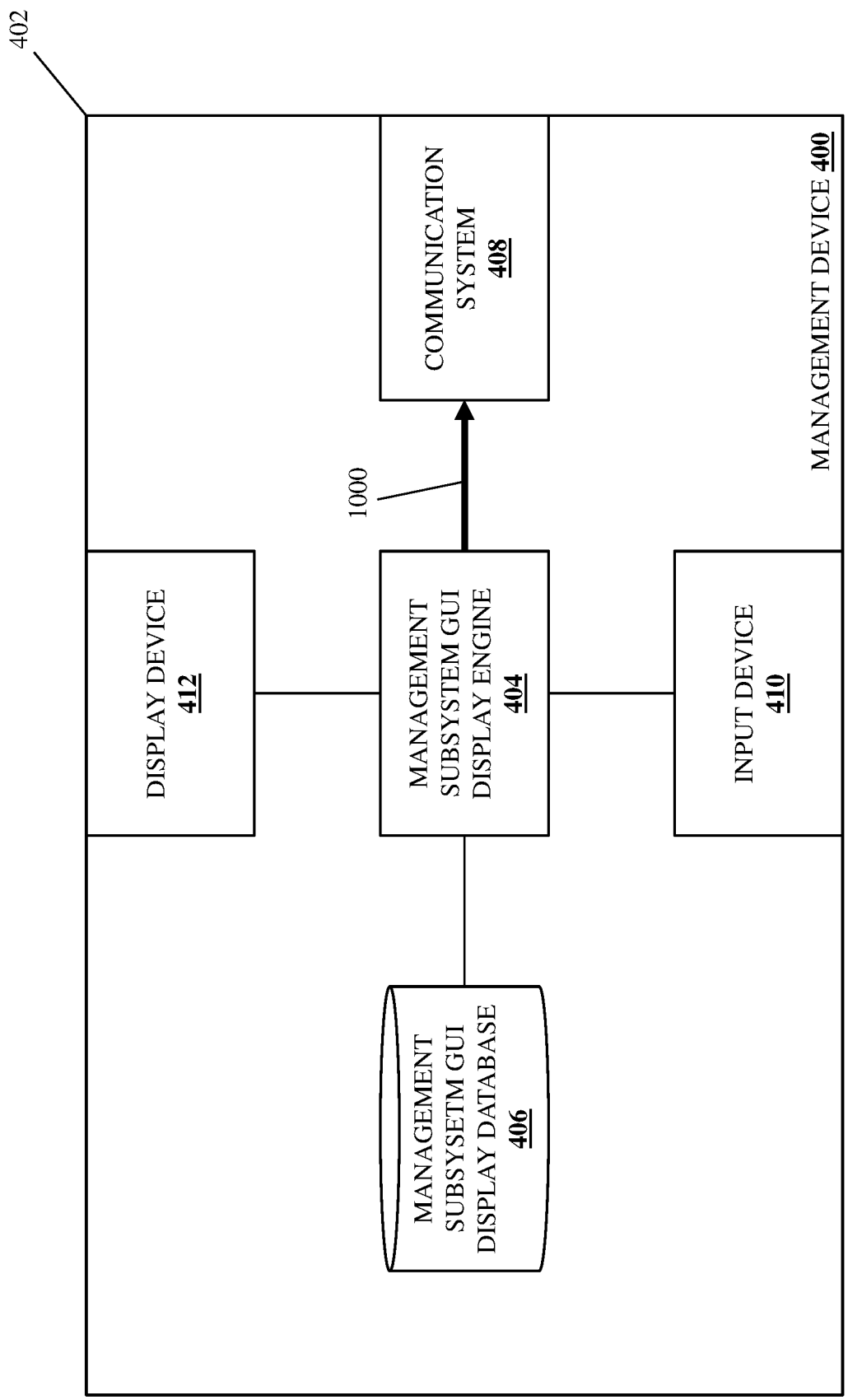
FIG. 10A is a schematic view illustrating an embodiment of the management device of FIG. 4 operating during the method of FIG. 5.
Figure 10B:
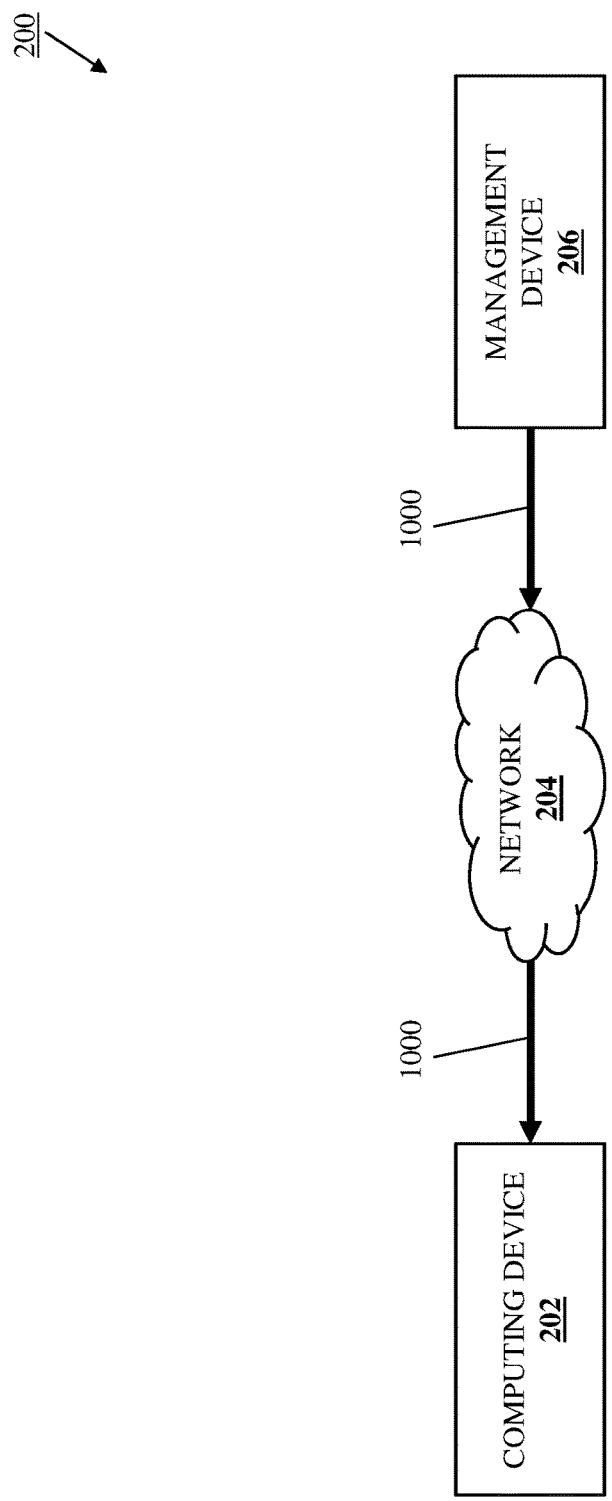
FIG. 10B is a schematic view illustrating an embodiment of the networked system of FIG. 2 operating during the method of FIG. 5.
Figure 10C:
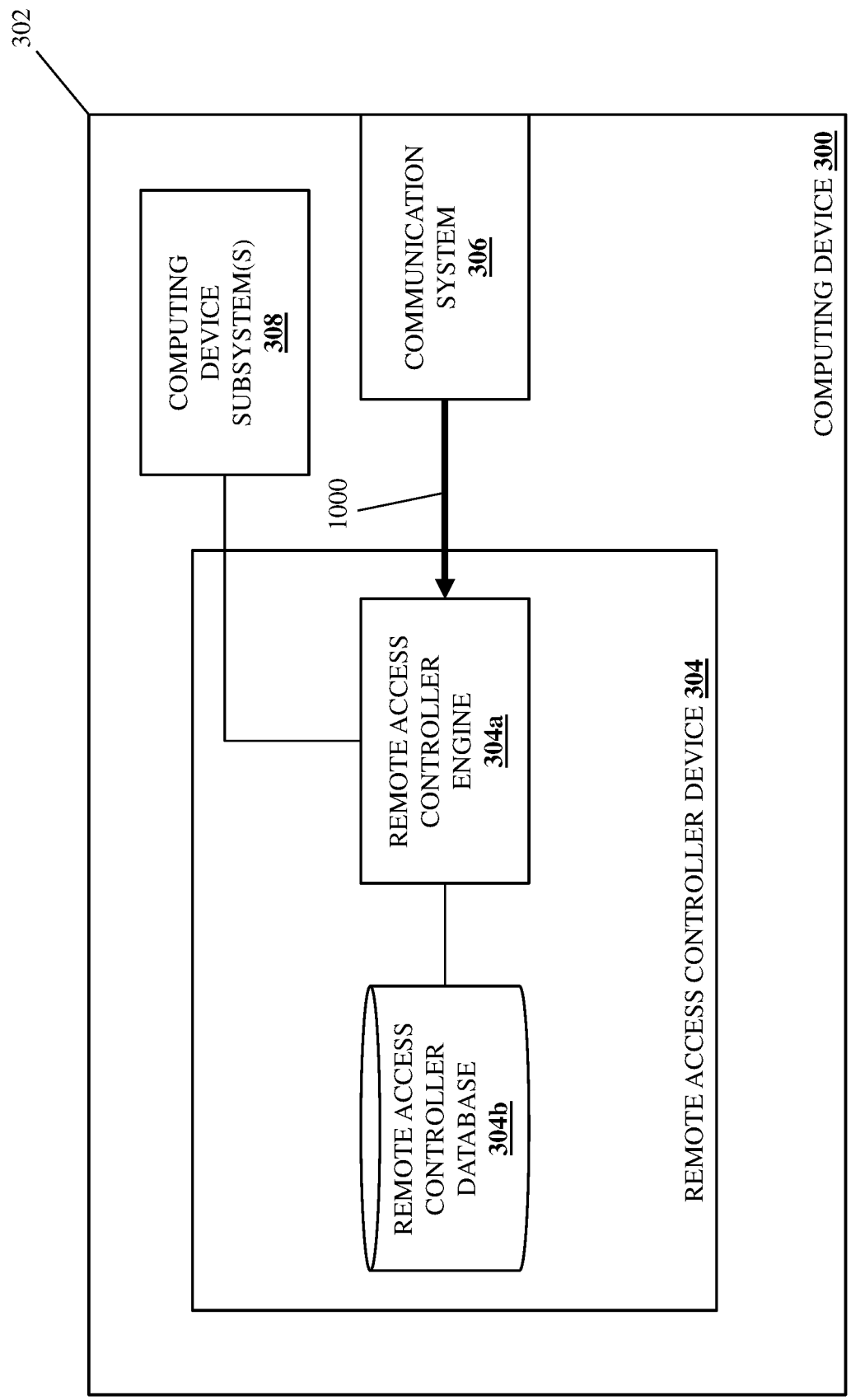
FIG. 10C is a schematic view illustrating an embodiment of the computing device of FIG. 3 operating during the method of FIG. 5.

With reference to FIG. 9C, the management subsystem GUI launch page credential provisioning/management action selection/management action performance instruction operations 900 may include the network administrator (or other user) utilizing the input device 410 to select the perform action element 814 (with that selection illustrated by the "greyed" perform action element 814 in FIG. 9C). As discussed in further detail below, the selection of the perform action element 814 may be the last action (e.g., a "single click") performed by the network administrator (or other user) via the management subsystem GUI launch page 800 as part of the method 500, after which a plurality of operations are performed automatically (i.e., without further input from the network administrator or other user to the management subsystem GUI launch page 800) while the management subsystem GUI launch page 800 continues to be displayed on the display device 412 on the management device 400. As illustrated in FIGS. 10A, 10B, 10C, the selection of the perform action element 814 may cause the management subsystem GUI display engine 404 to perform credential/management action transmission operations 1000 that may include transmitting the credentials and management action provided/selected in the management subsystem GUI launch page 800 via the communication system 408, through the network 204, and to the computing device 202/300 such that the remote access controller engine 304a in the remote access controller device 304 receives the credentials and management action via the communication system 306. As discussed above, the credential/management action transmission operations 1000 may utilize SSL (e.g., OpenSSL) and/or other secure communication techniques that would be apparent to one of skill in the art in possession of the present disclosure.

Figure 11:
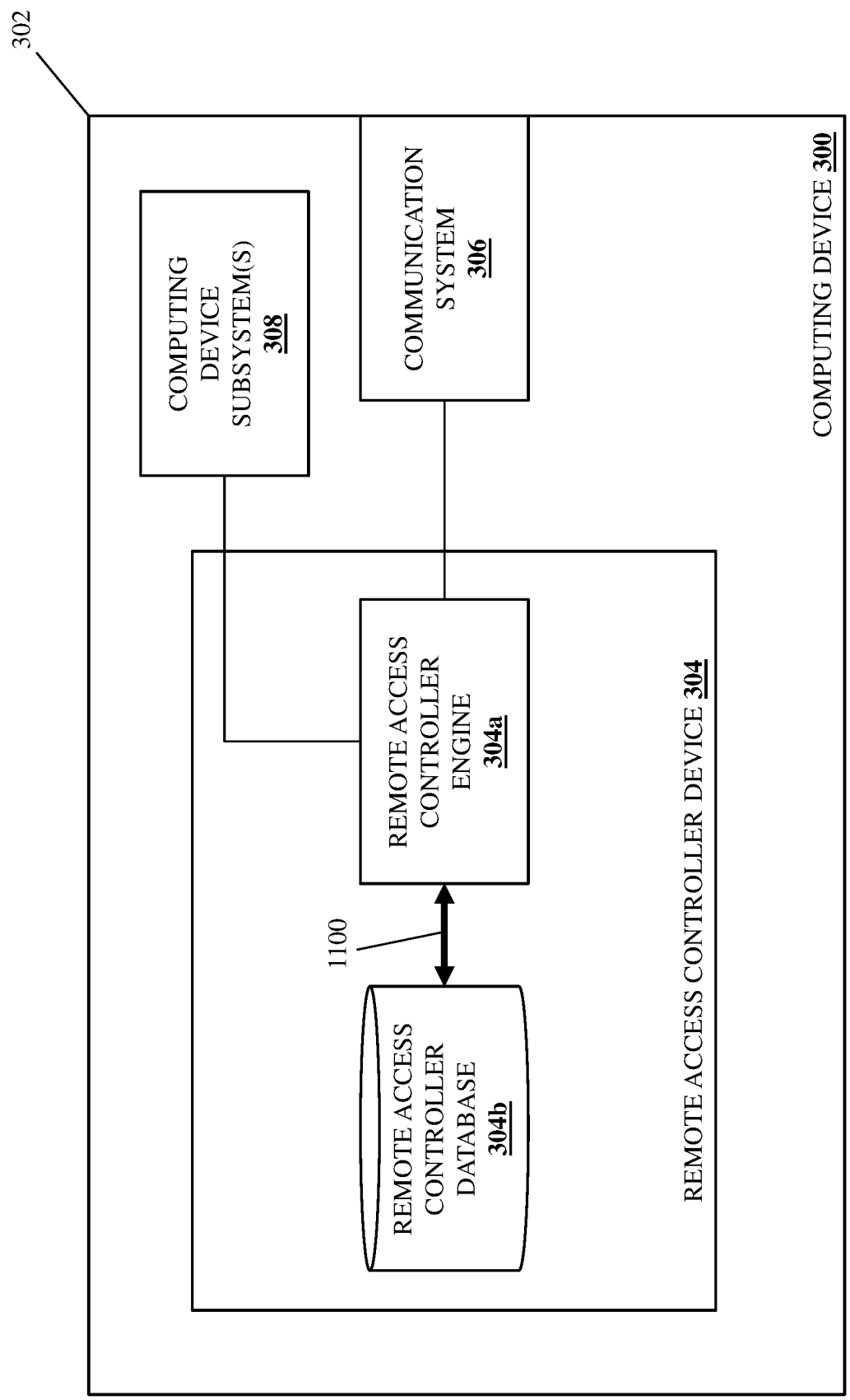
FIG. 11 is a schematic view illustrating an embodiment of the computing device of FIG. 3 operating during the method of FIG. 5.
Figure 12A:
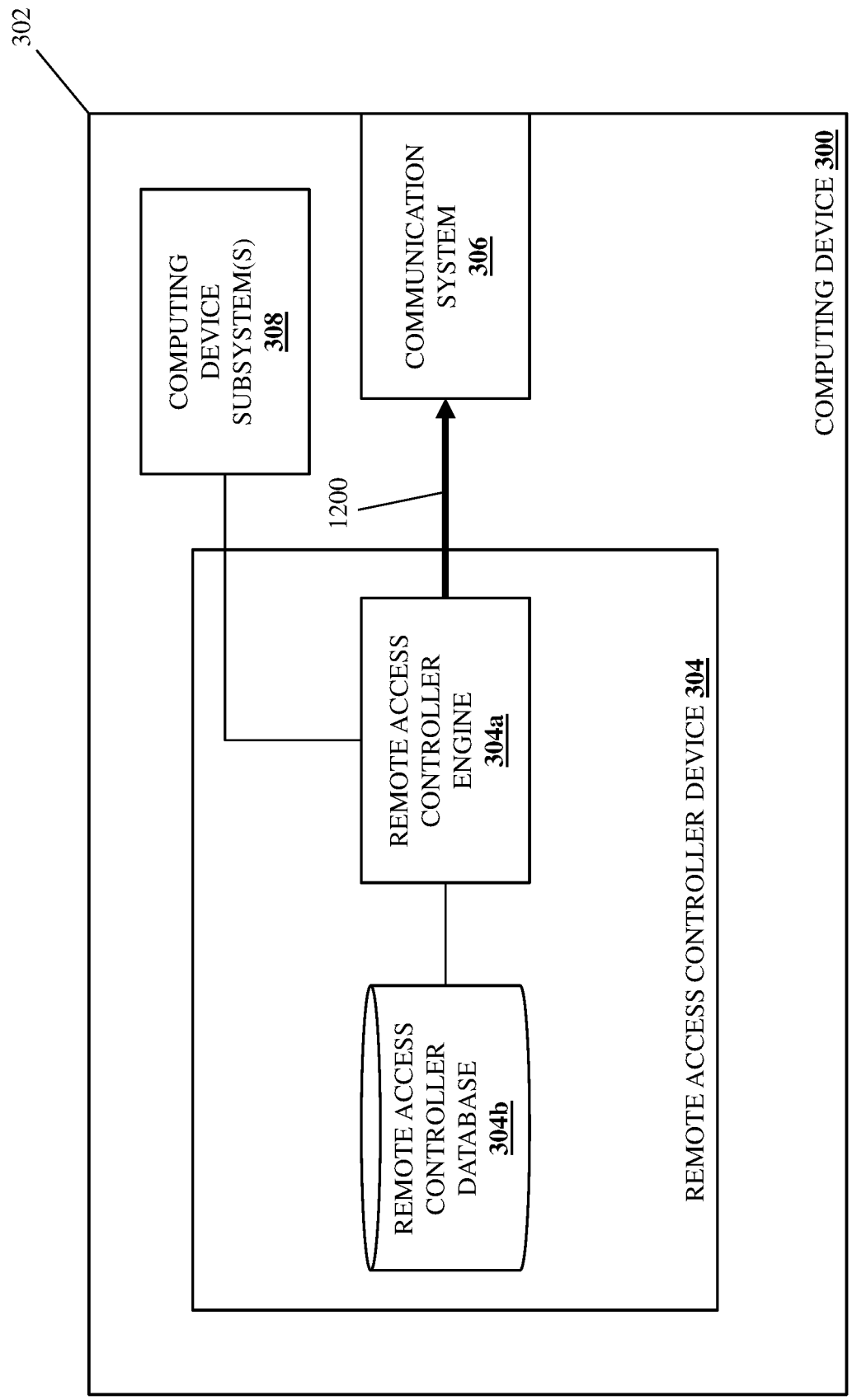
FIG. 12A is a schematic view illustrating an embodiment of the computing device of FIG. 3 operating during the method of FIG. 5.
Figure 12B:
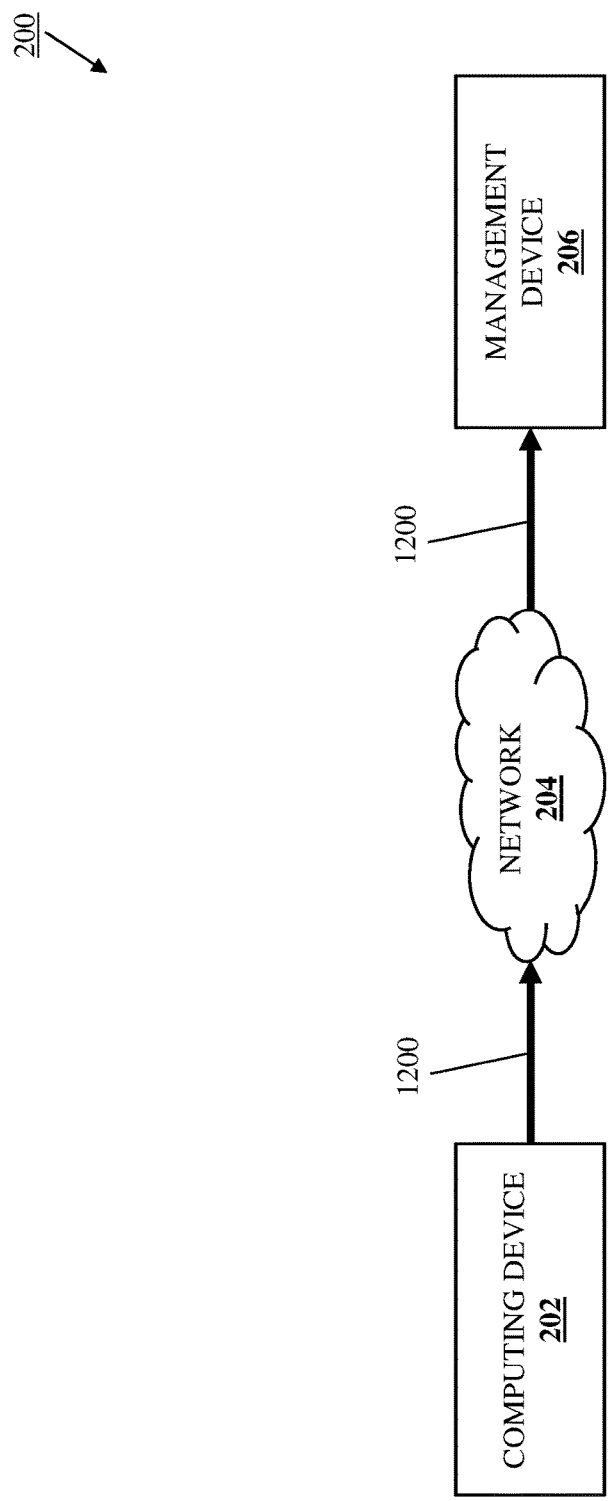
FIG. 12B is a schematic view illustrating an embodiment of the networked system of FIG. 2 operating during the method of FIG. 5.
Figure 12C:
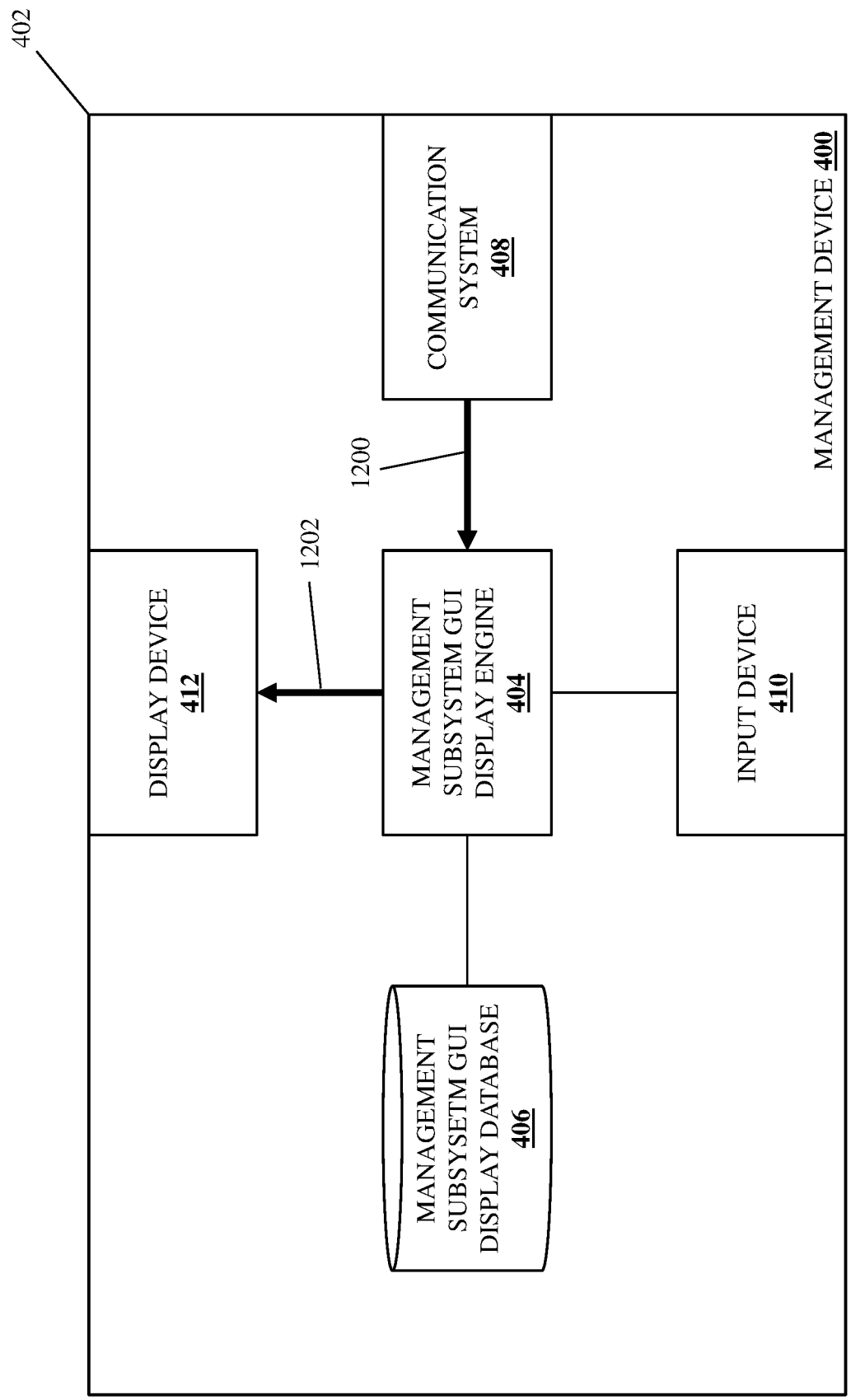
FIG. 12C is a schematic view illustrating an embodiment of the management device of FIG. 4 operating during the method of FIG. 5.
Figure 13A:
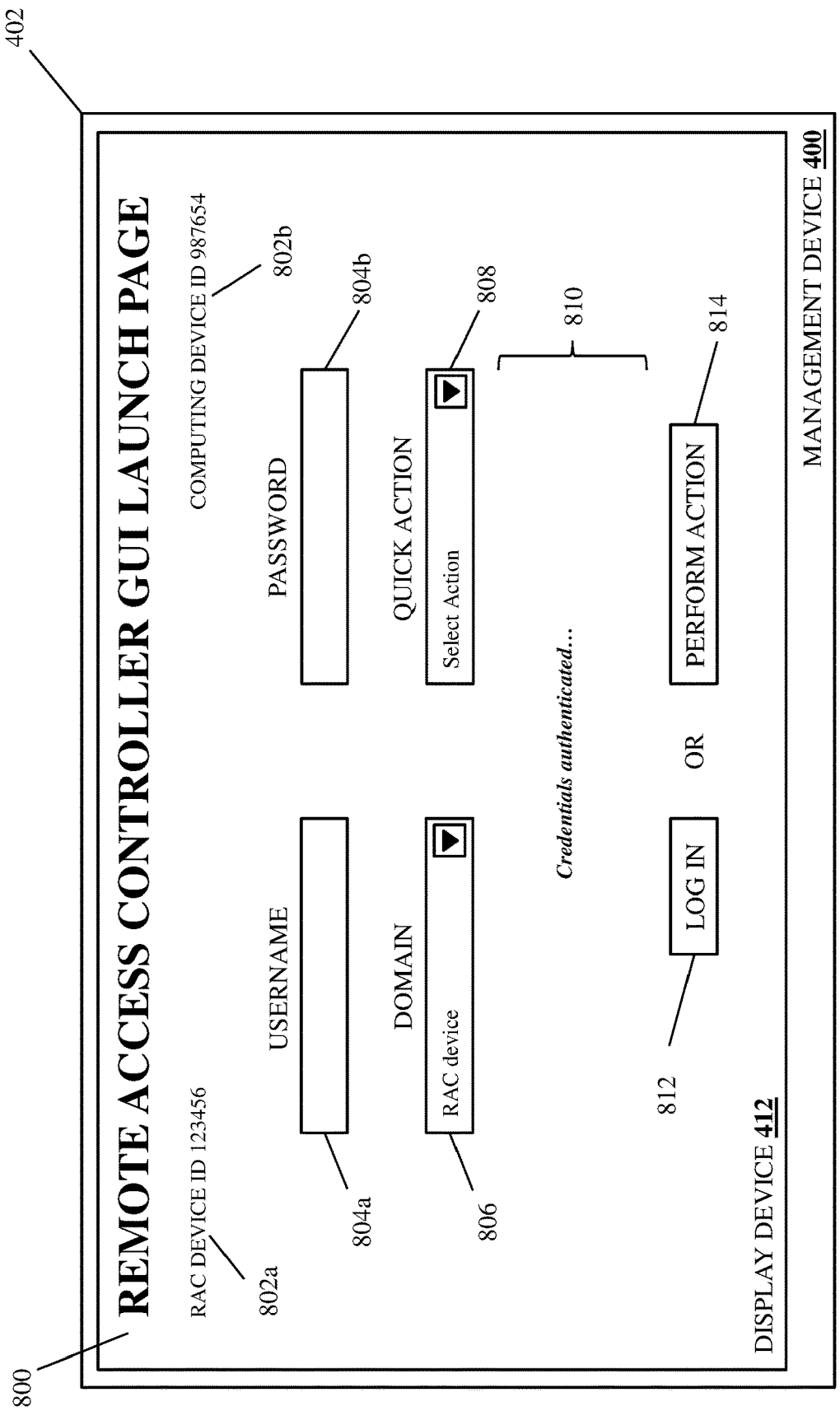
FIG. 13A is a screen shot view illustrated an embodiment of the management subsystem GUI launch page of FIG. 8 on the management device 400 of FIG. 4 during the method of FIG. 5.
Figure 13B:
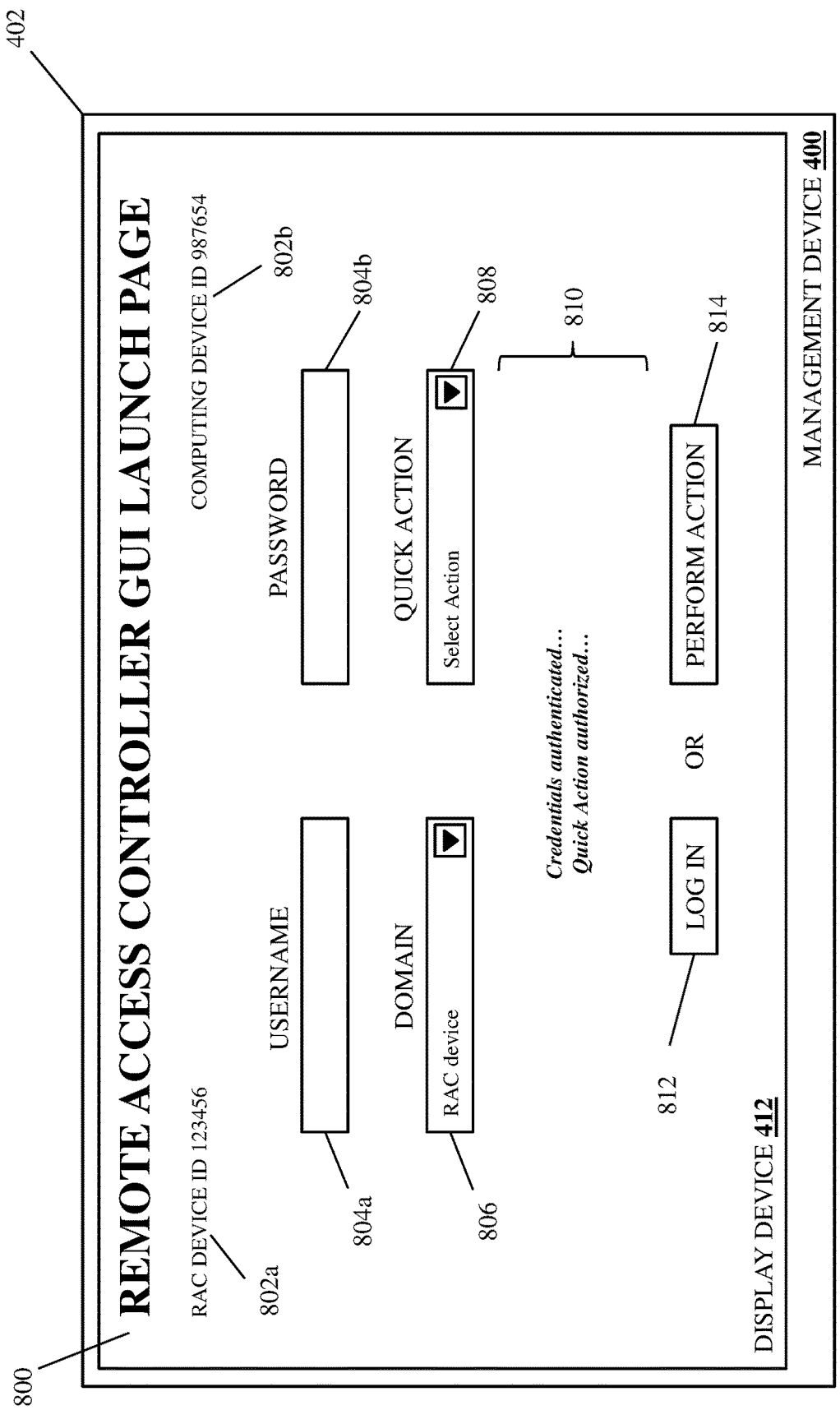
FIG. 13B is a screen shot view illustrated an embodiment of the management subsystem GUI launch page of FIG. 8 on the management device 400 of FIG. 4 during the method of FIG. 5.
Figure 13C:
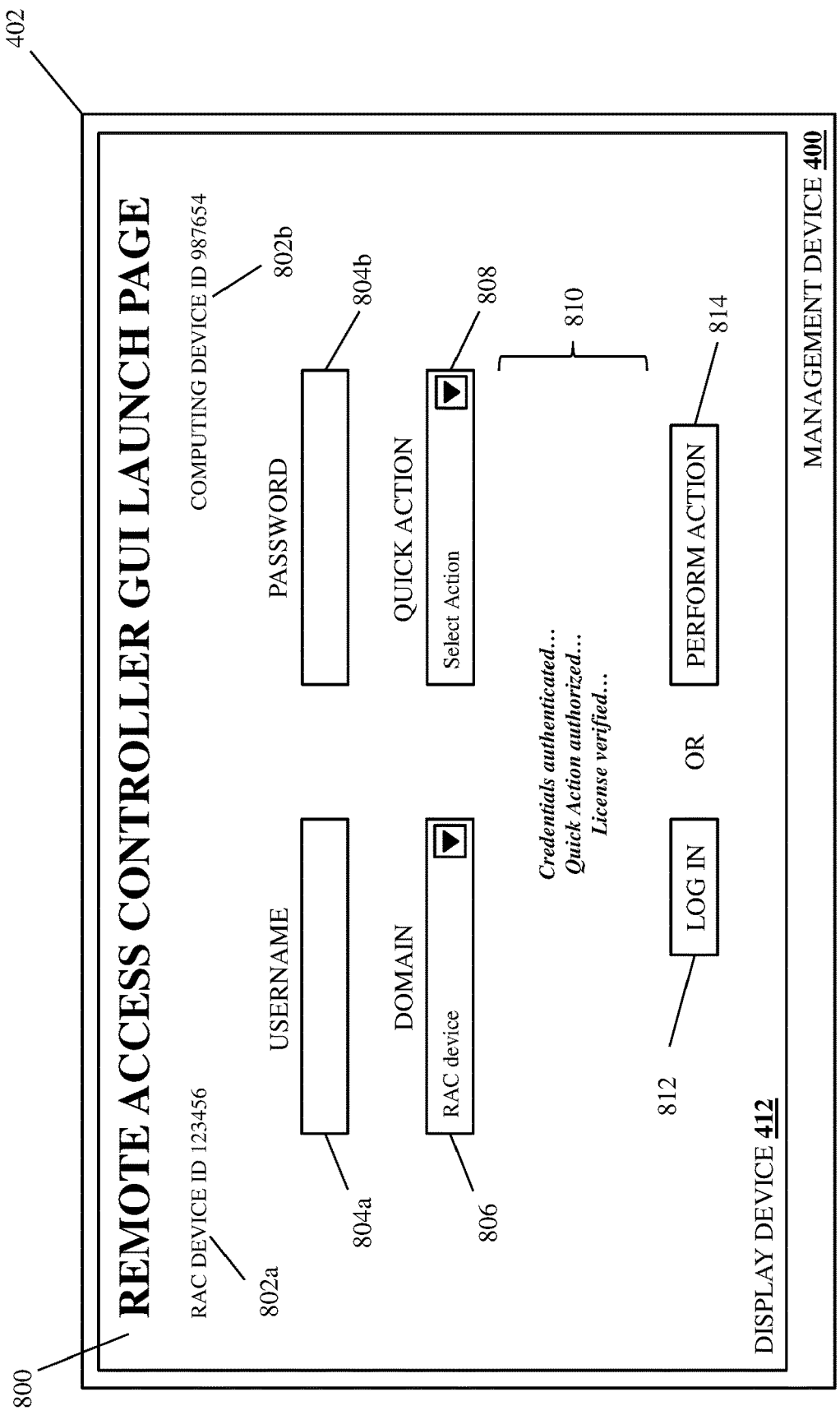
FIG. 13C is a screen shot view illustrated an embodiment of the management subsystem GUI launch page of FIG. 8 on the management device 400 of FIG. 4 during the method of FIG. 5.
Figure 13D:
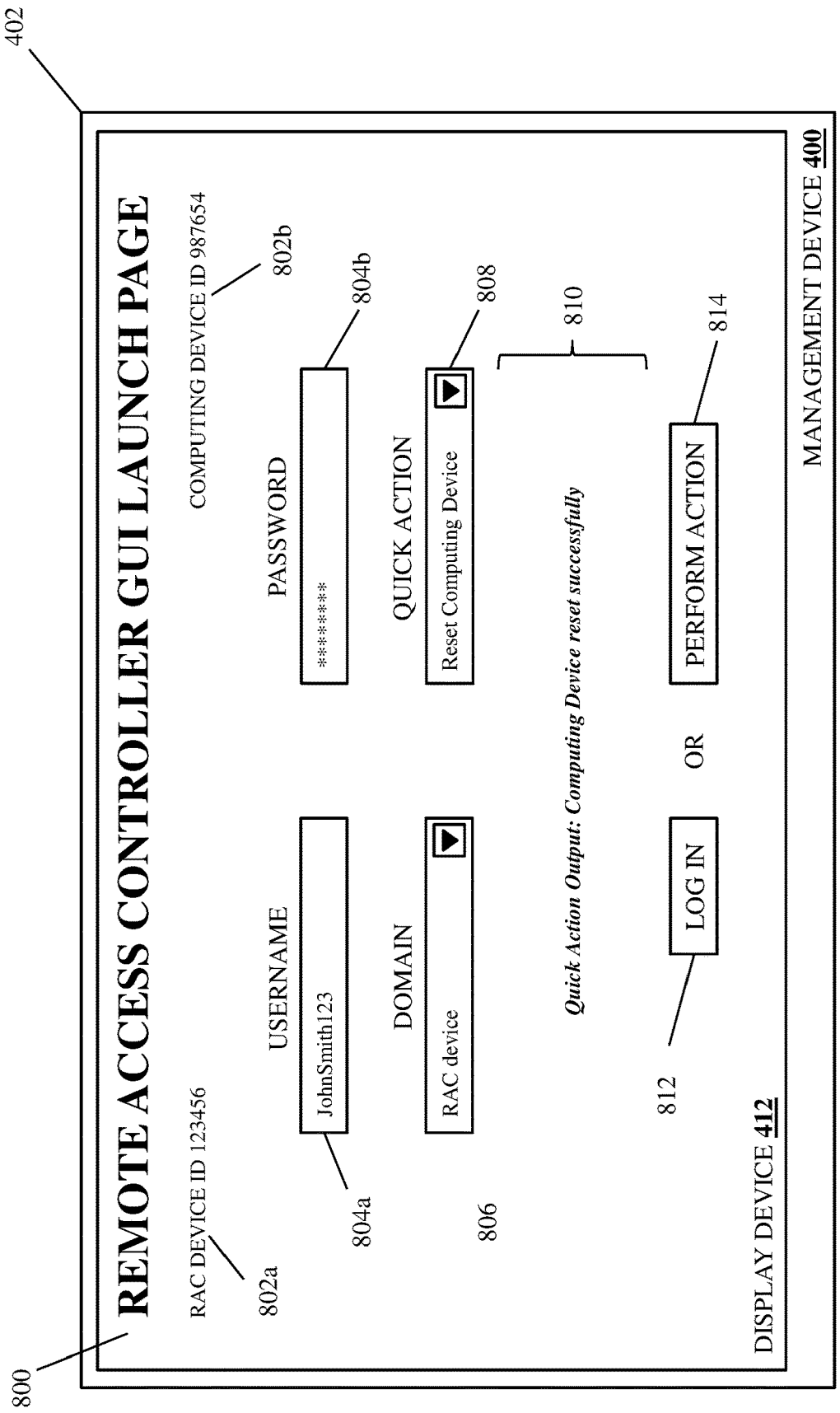
FIG. 13D is a screen shot view illustrated an embodiment of the management subsystem GUI launch page of FIG. 8 on the management device 400 of FIG. 4 during the method of FIG. 5.

The method 500 then proceeds to block 506 where the management subsystem automatically authenticates the credentials while the management subsystem GUI launch page continues to be displayed on the management device. With reference to FIG. 11, in an embodiment of block 506 and in response to receiving the credentials, the remote access controller engine 304a may operate to automatically (e.g., following the selection of the perform action element 814 on the management subsystem GUI launch page 800 by the network administrator or other user and without further input from the network administrator or other user on the management subsystem GUI launch page 800) perform remote access controller database access operations 1100 that include authenticating the credentials received at block 504 using any of a variety of credential authentication operations that would be apparent to one of skill in the art in possession of the present disclosure.

With reference to FIGS. 12A, 12B, 12C, and 13A and in response to authenticating the credentials, the remote access controller engine 304a in the remote access controller device 304 may perform management action performance update operations 1200 that may include transmitting a credential authentication result communication via its communication system 306, through the network 204, and to the management subsystem GUI display engine 404 (e.g., via its communication system 408) so that the management subsystem GUI display engine 404 may perform management subsystem GUI launch page update operations 1202 to update the information section 810 on the management subsystem GUI launch page 800 being displayed on the management device 400 (e.g., "Credentials authenticated . . . " in the example illustrated in FIG. 13A). Furthermore, while not illustrated herein, one of skill in the art in possession of the present disclosure will appreciate how, in the event the credentials cannot be authenticated, the remote access controller engine 304a in the remote access controller device 304 may transmit a credential authentication result communication via its communication system 306, through the network 204, and to the management subsystem GUI display engine 404 (e.g., via its communication system 408) so that the management subsystem GUI display engine 404 may update the information section 810 on the management subsystem GUI launch page 800 being displayed on the management device 400 (e.g., "Credential authentication failed . . . "), and the method 500 may end.

The method 500 then proceeds to block 508 where the management subsystem automatically authorizes the management action based on the credentials while the management subsystem GUI launch page continues to be displayed on the management device. With reference back to FIG. 11, in an embodiment of block 508 and in response to authenticating the credentials at block 506, the remote access controller engine 304a may operate to automatically (e.g., following the selection of the perform action element 814 on the management subsystem GUI launch page 800 by the network administrator or other user and without further input from the network administrator or other user on the management subsystem GUI launch page 800) perform the remote access controller database access operations 1100 that include authorizing the management action received at block 504 based on the authenticated credentials using any of a variety of management action authorization operations that would be apparent to one of skill in the art in possession of the present disclosure.

For example, one of skill in the art in possession of the present disclosure will recognize how the performance of at least some management actions may be restricted to network administrators (or other users) with particular roles, permissions, or other authorizations, and thus at block 508 the remote access controller engine 304a may authorize the management action by determining whether the credentials authenticated at block 506 are associated with a role, permission of other authorization to perform the management action received at block 504. Furthermore, in embodiments of the present disclosure that allow for the selection/identification of multiple management actions, authorization of the management actions may include the remote access controller engine 304a in the remote access controller device 304 determining whether the multiple management actions that were selected/identified are compatible with each other, i.e., whether each of those multiple management actions can each be performed without presenting some conflict with the other management actions. As such, one of skill in the art in possession of the present disclosure will appreciate how the remote access controller engine 304a in the remote access controller device 304 may be configured, in the event of a management action conflict, to suggest modifications to the selected/identified management actions (e.g., by removing a management action that presents the management action conflict) and/or otherwise eliminate the management action conflict.

With reference to FIGS. 12A, 12B, 12C, and 13B and in response to authorizing the management action, the remote access controller engine 304a in the remote access controller device 304 perform the management action performance update operations 1200 that may include transmitting a management action authorization result communication via its communication system 306, through the network 204, and to the management subsystem GUI display engine 404 (e.g., via its communication system 408) so that the management subsystem GUI display engine 404 may update the information section 810 on the management subsystem GUI launch page 800 being displayed on the management device 400 (e.g., "Quick Action authorized . . . " in the example in FIG. 13B). Furthermore, while not illustrated herein, one of skill in the art in possession of the present disclosure will appreciate how, in the event the management action is not authorized, the remote access controller engine 304a in the remote access controller device 304 may transmit a management action authorization result communication via its communication system 306, through the network 204, and to the management subsystem GUI display engine 404 (e.g., via its communication system 408) so that the management subsystem GUI display engine 404 may update the information section 810 on the management subsystem GUI launch page 800 being displayed on the management device 400 (e.g., "Management action authorization failed . . . "), and the method 500 may end.

The method 500 then proceeds to block 510 where the management subsystem automatically verifies the management subsystems license to perform the management action while the management subsystem GUI launch page continues to be displayed on the management device. With reference back to FIG. 11, in an embodiment of block 510 and in response to authorizing the management action at block 508, the remote access controller engine 304a may operate to automatically (e.g., following the selection of the perform action element 814 on the management subsystem GUI launch page 800 by the network administrator or other user and without further input from the network administrator or other user on the management subsystem GUI launch page 800) perform the remote access controller database access operations 1100 that include verifying that the remote access controller device 304 is licensed to perform the management action using any of a variety of management action/management subsystem license verification operations that would be apparent to one of skill in the art in possession of the present disclosure. For example, one of skill in the art in possession of the present disclosure will recognize how the performance of at least some management actions may be restricted to remote access controller device licensing (e.g., a network administrator or other user must purchase a license for the remote access controller device 304 to perform those management actions), and thus at block 510 the remote access controller engine 304a may verify that the remote access controller device 304 is licensed to perform the management action by determining whether a license for the remote access controller device 304 authorizes the performance of the management action.

With reference to FIGS. 12A, 12B, 12C, and 13C and in response to verifying that the remote access controller device 304 is licensed to perform the management action, the remote access controller engine 304a in the remote access controller device 304 perform the management action performance update operations 1200 that may include transmitting a license verification result communication via its communication system 306, through the network 204, and to the management subsystem GUI display engine 404 (e.g., via its communication system 408) so that the management subsystem GUI display engine 404 may update the information section 810 on the management subsystem GUI launch page 800 being displayed on the management device 400 (e.g., "License verified . . . " in the example illustrated in FIG. 13C). Furthermore, while not illustrated herein, one of skill in the art in possession of the present disclosure will appreciate how, in the event the remote access controller device 304 is not licensed to perform the management action, the remote access controller engine 304a in the remote access controller device 304 may transmit a license verification result communication via its communication system 306, through the network 204, and to the management subsystem GUI display engine 404 (e.g., via its communication system 408) so that the management subsystem GUI display engine 404 may update the information section 810 on the management subsystem GUI launch page 800 being displayed on the management device 400 (e.g., "License verification failed . . . "), and the method 500 may end.

The method 500 then proceeds to block 512 where the management subsystem automatically performs the management action while the management subsystem GUI launch page continues to be displayed on the management device. One of skill in the art in possession of the present disclosure will appreciate how, in different embodiments of block 512, the remote access controller engine 304a in the remote access controller device 304 may perform a variety of different management actions associated with the computing device 300, which may include management actions performed on the remote access controller device 304, management actions performed on the computing device 202/300, management actions performed on the computing device subsystem(s) 308, and/or any other management actions that would be apparent to one of skill in the art in possession of the present disclosure. As discussed above, while the specific examples of management actions provided herein include rebooting the remote access controller device 304, powering off the computing device 202/300, resetting/ "warm booting" the computing device 202/300, power cycling/"cold booting" the computing device 202/300, showing critical alerts, and launching a virtual console, any management actions known in the art may be performed at block 512 while remaining within the scope of the present disclosure.

The method 500 then proceeds to block 514 where the management subsystem automatically provides information associated with a result of the performance of the management action for display on the management subsystem GUI launch page while the management subsystem GUI launch page continues to be displayed on the management device. With reference to FIGS. 12A, 12B, 12C, and 13D, at block 514 and in response to performing the management action, the remote access controller engine 304a in the remote access controller device 304 perform the management action performance update operations 1200 that may include transmitting a management action performance result communication via its communication system 306, through the network 204, and to the management subsystem GUI display engine 404 (e.g., via its communication system 408) so that the management subsystem GUI display engine 404 may update the information section 810 on the management subsystem GUI launch page 800 being displayed on the management device 400 (e.g., "Quick Action Output: Computing Device reset successfully . . . " in the example illustrated in FIG. 13D).

Furthermore, while not illustrated herein, one of skill in the art in possession of the present disclosure will appreciate how, in the event the remote access controller device 304 is not able to perform the management action, the remote access controller engine 304a in the remote access controller device 304 may transmit a management action performance result communication via its communication system 306, through the network 204, and to the management subsystem GUI display engine 404 (e.g., via its communication system 408) so that the management subsystem GUI display engine 404 may update the information section 810 on the management subsystem GUI launch page 800 being displayed on the management device 400 (e.g., "Quick Action Output: Computing Device reset unsuccessful . . . "), and the method 500 may end.

As such, the network administrator (or other user) may be presented with the remote access controller GUI launch page 800 that allows them to provide credentials, identify a management action, and then select a perform action element 814 (e.g., via a "single click") in order to have the remote access controller device 304 automatically perform (i.e., without further input from the network administrator or other user via the remote access controller GUI launch page 800) credential authentication, management action authorization, and license verification, as well as perform the identified management action (if the authentication, authorization, and verification are successful), all while the remote access controller GUI launch page 800 continues to be displayed on the management device 206/400, without launching the management subsystem (i.e., the remote access controller GUI home page or any remote access controller GUI management action pages), and without the need to begin or maintain an active user session.

In particular, with regard to active user sessions, one of skill in the art in possession of the present disclosure will appreciate how the use of the credentials and the identified management action provided via the management subsystem GUI launch page to provide for the performance of the management action differs from conventional management subsystems that authenticate a user and begin/maintain an active user session in which that user may perform any management actions they have authorization to perform via a management subsystem GUI home page and/or management subsystem GUI management action pages. Furthermore, one of skill in the art in possession of the present disclosure will appreciate how the systems and methods of the present disclosure allow for the distribution of "limited" credentials that allow the holder of those credentials to perform a limited set of management actions (or a single, particular management action) via the management subsystem GUI launch page, and do not allow the holder of those credentials to access the management subsystem (e.g., the management subsystem GUI home page or management subsystem GUI management action pages).

As such, one of skill in the art in possession of the present disclosure will appreciate how the method 500 eliminates the need for many remote access controller device resource consumption operations such as, for example, beginning/maintaining an active user session, downloading information for display on the remote access controller GUI home page and/or remote access controller GUI management action pages, transmitting the remote access controller GUI home page and/or remote access controller GUI management action pages via the network to the management device, and/or other resource consumption operations known in the art.

Figure 14:
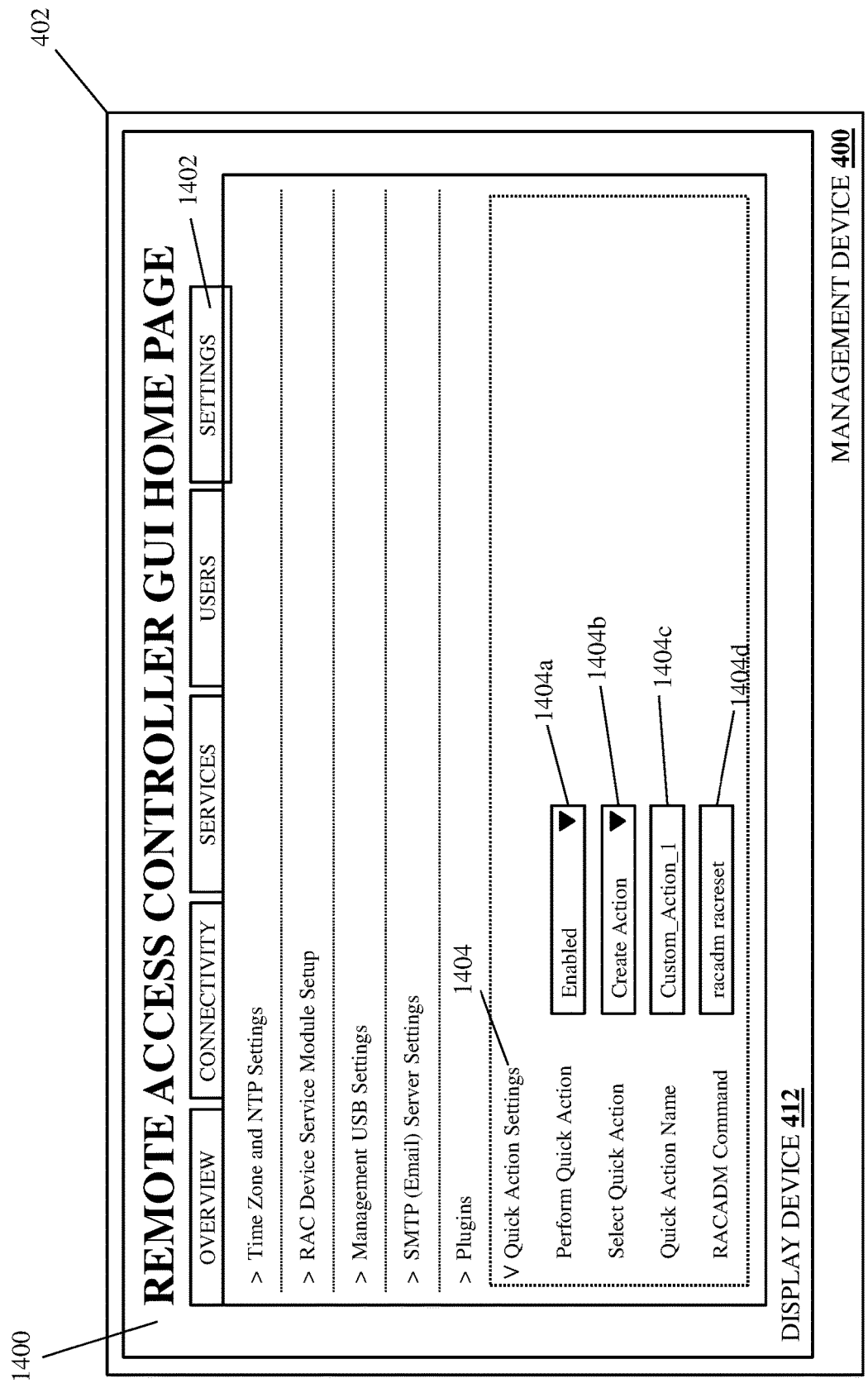
FIG. 14 is a screen shot view illustrated an embodiment of a management subsystem GUI home page displayed on the management device 400 of FIG. 4 and being used to define a management action.

With reference to FIG. 14, an embodiment of a remote access controller GUI home page 1400 is illustrated that may allow a network administrator (or other user) to define a custom management action that may be later selected on the remote access controller GUI launch page 800 as discussed above. In the illustrated embodiment, the remote access controller GUI home page 1400 includes a settings tab 1402 having a management action settings section 1404. The management action setting section 1404 includes a management action enablement element 1404a that may allow a network administrator (or other user) to enable or disable a management action via the remote access controller GUI launch page 800, a management action creation element 1404b that may allow a network administrator (or other user) to create a custom management action (e.g., via the "Create Action" selection using the "dropdown" feature in the example illustrated in FIG. 14) for selection via the remote access controller GUI launch page 800, a management action naming element 1404c that may allow a network administrator (or other user) to name a custom management action (e.g., "Custom_Action_1" in the example illustrated in FIG. 14) that may be selected via the remote access controller GUI launch page 800, and a management action command element 1404b that may allow a network administrator (or other user) to define a command that will be executed (e.g., the "racadm racreset" CLI command in the example illustrated in FIG. 14) when the custom management action is selected via the remote access controller GUI launch page 800. While the custom management action defined in the example illustrated in FIG. 14 provides for the reset of a remote access controller device, one of skill in the art in possession of the present disclosure will recognize how any of a variety of management actions may be defined in a similar manner while remaining within the scope of the present disclosure. Furthermore, while a specific technique for defining management actions is illustrated and described, one of skill in the art in possession of the present disclosure will appreciate how management actions may be defined in a variety of manners that will fall within the scope of the present disclosure as well.

Thus, systems and methods have been described that provide for the performance of management actions from a remote access controller Graphical User Interface (GUI) launch page without the need to launch a full remote access controller interface and/or begin/maintain an active user session. For example, the quick management action system of the present disclosure may include a computing device having a remote access controller device that is coupled to a management device. The remote access controller device provides a remote access controller GUI launch page for display on the management device, receives credentials and an identification of a management action associated with the computing device from the management device via the remote access controller GUI launch page. The remote access controller device then, automatically while the remote access controller GUI launch page continues to be displayed on the management device, authenticates the credentials, authorizes the management action based on the credentials and, in response, performs the management action, and provides information associated with a result of the performance of the management action for display on the remote access controller GUI launch page. As such, management actions, and particularly management actions that are performed repeatedly by network administrators, may be performed quicker than conventional remote access controller devices allow while also consuming less remote access controller device resources.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A quick management action system, comprising:
 a management device; and
 a computing device that includes a management subsystem that is coupled to the management device, wherein the management subsystem is configured to:
  provide, for display on the management device, a management subsystem Graphical User Interface (GUI) launch page; that includes:
   at least one credential element;
   a management action select element; and
   a perform action element; and
  receive, from the management device via the management subsystem GUI launch page, credentials in the at least one credential element, an identification of a management action associated with the computing device in the management action select element, and a single selection of the perform action element and, automatically while the management subsystem GUI launch page is provided for display on the management device and without beginning or maintaining an active user session;
  authenticate the credentials;
  authorize the management action based on the credentials;
  perform, in response to authenticating the credentials and authorizing the management action, the management action; and
  provide, for display on the management subsystem GUI launch page in response to performing the management action, information associated with a result of the performance of the management action.

2. The system of claim 1, wherein the management action is identified from a plurality of management actions that are provided for display on the management subsystem GUI launch page by the management subsystem.

3. The system of claim 2, wherein the management subsystem is configured to:
 provide the plurality of management actions for display on the management subsystem GUI launch page based on the credentials having been used to previously perform the plurality of management actions.

4. The system of claim 1, wherein the management subsystem is a remote access controller device.

5. The system of claim 1, wherein the management subsystem is configured, automatically while the management subsystem GUI launch page is provided for display on the management device and without beginning or maintaining an active user session, to:
 verify that that the management subsystem is licensed to perform the management action, wherein the management action is performed in response to authenticating the credentials, authorizing the management action, and verifying the management subsystem is licensed to perform the management action.

6. The system of claim 1, wherein the management subsystem GUI launch page includes a management action performance result information dynamic update section that is configured to dynamically update the information associated with the result of the performance of the management action as the management action is performed.

7. The system of claim 1, wherein the information associated with the result of the performance of the management action includes text information that is provided for display in the management subsystem GUI launch page and that describes a result of the performance of the management action.

8. An Information Handling System (IHS), comprising:
 a management subsystem including:
  a processing system; and
  a memory system that is coupled to the processing system and that includes instructions that, when executed by the processing system, cause the processing system to provide a management engine that is configured to:
   provide, for display on a management device, a management subsystem Graphical User Interface (GUI) launch page; that includes:
    at least one credential element;
    a management action select element; and
    a perform action element; and
   receive, from the management device via the management subsystem GUI launch page, credentials in the at least one credential element, an identification of a management action associated with the IHS in the management action select element, and a single selection of the perform action element and, automatically while the management subsystem GUI launch page is provided for display on the management device and without beginning or maintaining an active user session:
   authenticate the credentials;
   authorize the management action based on the credentials;
   perform, in response to authenticating the credentials and authorizing the management action, the management action; and
   provide, for display on the management subsystem GUI launch page in response to performing the management action, information associated with a result of the performance of the management action.

9. The IHS of claim 8, wherein the management subsystem is a remote access controller device.

10. The IHS of claim 8, wherein the management engine is configured, automatically while the management subsystem GUI launch page is provided for display on the management device and without beginning or maintaining an active user session, to:
 verify that that the management subsystem is licensed to perform the management action, wherein the management action is performed in response to authenticating the credentials, authorizing the management action, and verifying the management subsystem is licensed to perform the management action.

11. The IHS of claim 8, wherein the management subsystem GUI launch page includes a management action performance result information dynamic update section that is configured to dynamically update the information associated with the result of the performance of the management action as the management action is performed.

12. The IHS of claim 8, wherein the management action is identified from a plurality of management actions that are provided for display on the management subsystem GUI launch page by the management engine.

13. The IHS of claim 8, wherein the information associated with the result of the performance of the management action includes text information that is provided for display in the management subsystem GUI launch page and that describes a result of the performance of the management action.

14. A method for performing quick management actions, comprising:

providing, by a management subsystem in a computing device for display on a management device, a management subsystem Graphical User Interface (GUI) launch page; that includes:
    at least one credential element;
    a management action select element; and
    a perform action element; and
  receiving, by the management subsystem from the management device via the management subsystem GUI launch page, credentials in the at least one credential element, an identification of a management action associated with the computing device in the management action select element, and a single selection of the perform action element and, automatically while the management subsystem GUI launch page is provided for display on the management device and without beginning or maintaining an active user session:
    authenticating, by the management subsystem, the credentials;
    authorizing, by the management subsystem, the management action based on the credentials;
    performing, by the management subsystem in response to authenticating the credentials and authorizing the management action, the management action; and
    providing, by the management subsystem for display on the management subsystem GUI launch page in response to performing the management action, information associated with a result of the performance of the management action.

15. The method of claim 14, wherein the management action is identified from a plurality of management actions that are provided for display on the management subsystem GUI launch page by the management subsystem.

16. The method of claim 15, further comprising:

providing, by the management subsystem, the plurality of management actions for display on the management subsystem GUI launch page based on the credentials having been used to previously perform the plurality of management actions.

17. The method of claim 14, wherein the management subsystem is a remote access controller device.

18. The method of claim 14, further comprising:

verifying, by the management subsystem automatically while the management subsystem GUI launch page is provided for display on the management device and without beginning or maintaining an active user session, that that the management subsystem is licensed to perform the management action, wherein the management action is performed in response to authenticating the credentials, authorizing the management action, and verifying the management subsystem is licensed to perform the management action.

19. The method of claim 14, wherein the management subsystem GUI launch page includes a management action performance result information dynamic update section that is configured to dynamically update the information associated with the result of the performance of the management action as the management action is performed.

20. The method of claim 14, wherein the information associated with the result of the performance of the management action includes text information that is provided for display in the management subsystem GUI launch page and that describes a result of the performance of the management action.

* * * * *